United States Patent
Homan et al.

(10) Patent No.: US 10,371,852 B2
(45) Date of Patent: Aug. 6, 2019

(54) FORMATION PROPERTIES FROM CONDUCTIVITY TENSOR

(75) Inventors: Dean M. Homan, Sugar Land, TX (US); Mark T. Frey, Sugar Land, TX (US); Sergiy Kryukov, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 631 days.

(21) Appl. No.: 13/333,354

(22) Filed: Dec. 21, 2011

(65) Prior Publication Data

US 2013/0166213 A1    Jun. 27, 2013

(51) Int. Cl.
*G01V 3/30* (2006.01)
*G01V 3/38* (2006.01)

(52) U.S. Cl.
CPC ............................. *G01V 3/30* (2013.01); *G01V 3/38* (2013.01)

(58) Field of Classification Search
CPC ............ G01V 3/28; G01V 3/30; G01V 13/00; G01V 3/38; G01V 3/34; E21B 47/022; E21B 47/102; E21B 47/02; H01Q 1/04; H01Q 25/00; H01Q 7/06
See application file for complete search history.

(56) References Cited

U.S. PATENT DOCUMENTS 3,849,721 A * 11/1974 Calvert ................... G01V 3/30
                                                            324/338
4,899,112 A    2/1990 Clark et al.
(Continued)

FOREIGN PATENT DOCUMENTS

WO      2011091216 A2    7/2011
WO    WO2011139761        11/2011

OTHER PUBLICATIONS

First Examination Report issued in AU application 2012355647 dated Aug. 7, 2014, 2 pgs.
(Continued)

*Primary Examiner* — Jill E Culler
*Assistant Examiner* — Leo T Hinze

(57) ABSTRACT

A logging tool having a plurality of spatially separated antennas is provided and used to make propagation-style measurements in a formation. Tensors are formed using the propagation-style measurements and one or more quantities are computed using the tensors. A formation evaluation is performed using the computed quantities. The formation evaluation determines a formation property or parameter such as horizontal resistivity, vertical resistivity, relative dip, azimuthal dip, bed boundary location, or bed thickness. The computed quantities may include compensated phase shift resistivity, compensated attenuation resistivity, symmetrized phase shift resistivity, symmetrized attenuation resistivity, anti-symmetrized phase shift resistivity, and anti-symmetrized attenuation resistivity. The measurements may be corrected for antenna gain errors and an air calibration may be performed. A zero-dimension inversion may be performed, while drilling, and the determined horizontal resistivity, vertical resistivity, relative dip, and/or azimuthal dip information may be sent to an uphole processor in real-time.

14 Claims, 24 Drawing Sheets

(56) References Cited

U.S. PATENT DOCUMENTS

| | | | |
|---|---|---|---|
| 5,869,968 A * | 2/1999 | Brooks | G01V 3/30 324/338 |
| 6,304,086 B1 | 10/2001 | Minerbo et al. | |
| 6,556,016 B2 | 4/2003 | Gao et al. | |
| 6,584,408 B2 | 6/2003 | Omeragic | |
| 6,819,111 B2 | 11/2004 | Fanini et al. | |
| 6,934,635 B2 | 8/2005 | Kennedy | |
| 6,998,844 B2 * | 2/2006 | Omeragic | G01V 3/30 324/338 |
| 7,027,923 B2 | 4/2006 | Barber et al. | |
| 7,239,145 B2 | 7/2007 | Homan et al. | |
| 7,386,430 B2 | 6/2008 | Barber et al. | |
| 7,463,035 B2 | 12/2008 | Merchant et al. | |
| 7,536,261 B2 | 5/2009 | Omeragic et al. | |
| 7,612,566 B2 | 11/2009 | Merchant et al. | |
| 7,663,372 B2 | 2/2010 | Signorelli et al. | |
| 7,733,093 B2 | 6/2010 | Homan et al. | |
| 7,737,697 B2 | 6/2010 | Yu et al. | |
| 7,759,943 B2 | 7/2010 | Homan et al. | |
| 7,839,149 B2 | 11/2010 | Wang et al. | |
| 7,848,887 B2 * | 12/2010 | Yang | E21B 7/04 324/338 |
| 2004/0010373 A1 | 1/2004 | Smits et al. | |
| 2004/0100263 A1 | 5/2004 | Fanini et al. | |
| 2004/0113609 A1 * | 6/2004 | Homan | G01V 13/00 324/202 |
| 2005/0140373 A1 * | 6/2005 | Li | G01V 3/30 324/338 |
| 2005/0274512 A1 | 12/2005 | Tabarovsky et al. | |
| 2008/0215243 A1 * | 9/2008 | Rabinovich | G01V 3/28 702/7 |
| 2008/0290873 A1 | 11/2008 | Homan et al. | |
| 2009/0018775 A1 | 1/2009 | Tabarovsky et al. | |
| 2009/0143991 A1 * | 6/2009 | Flaum | 702/12 |
| 2009/0167309 A1 * | 7/2009 | Homan | 324/339 |
| 2009/0179647 A1 | 7/2009 | Wang et al. | |
| 2010/0082255 A1 | 4/2010 | Davydycheva et al. | |
| 2010/0198569 A1 * | 8/2010 | Wu | G01V 3/38 703/6 |
| 2010/0225323 A1 | 9/2010 | Tabarovsky et al. | |
| 2010/0230095 A1 | 9/2010 | Yin | |
| 2010/0277176 A1 | 11/2010 | Homan et al. | |
| 2011/0267066 A1 | 11/2011 | Zhdanov | |
| 2012/0065889 A1 * | 3/2012 | Wu | G01V 3/28 702/11 |

OTHER PUBLICATIONS

Office Action issued in EP application 12859535.2 dated Sep. 14, 2015, 5 pages.

* cited by examiner

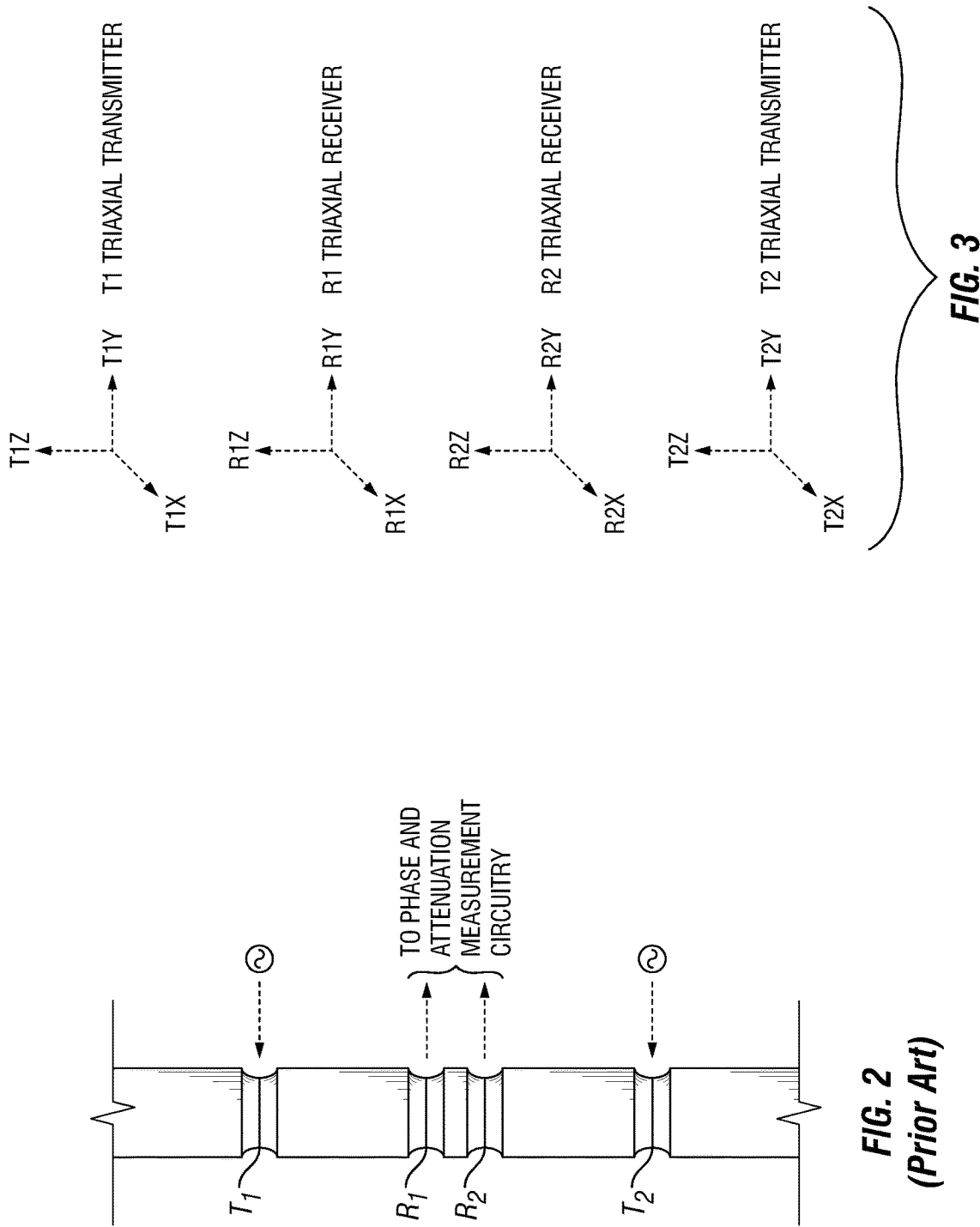

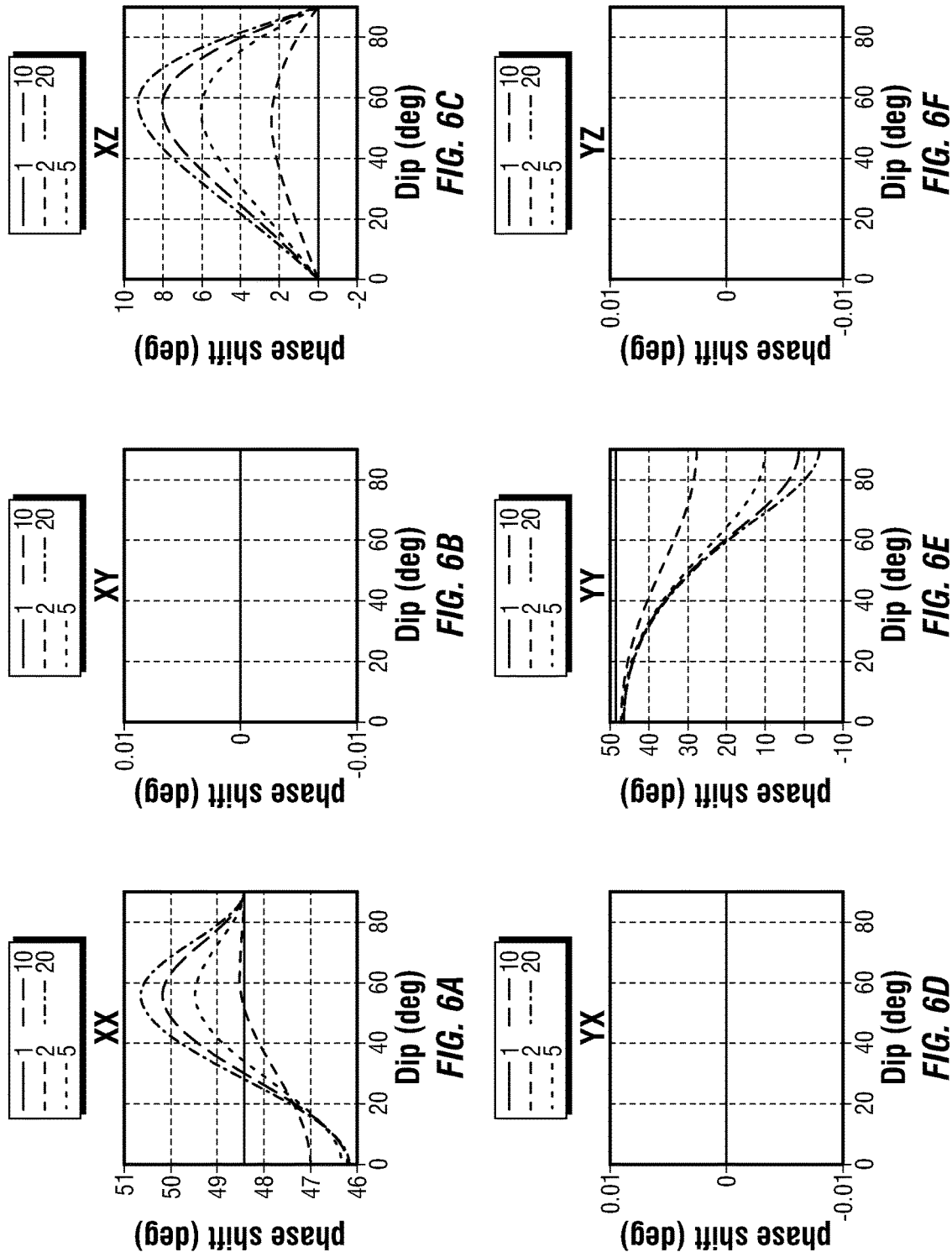

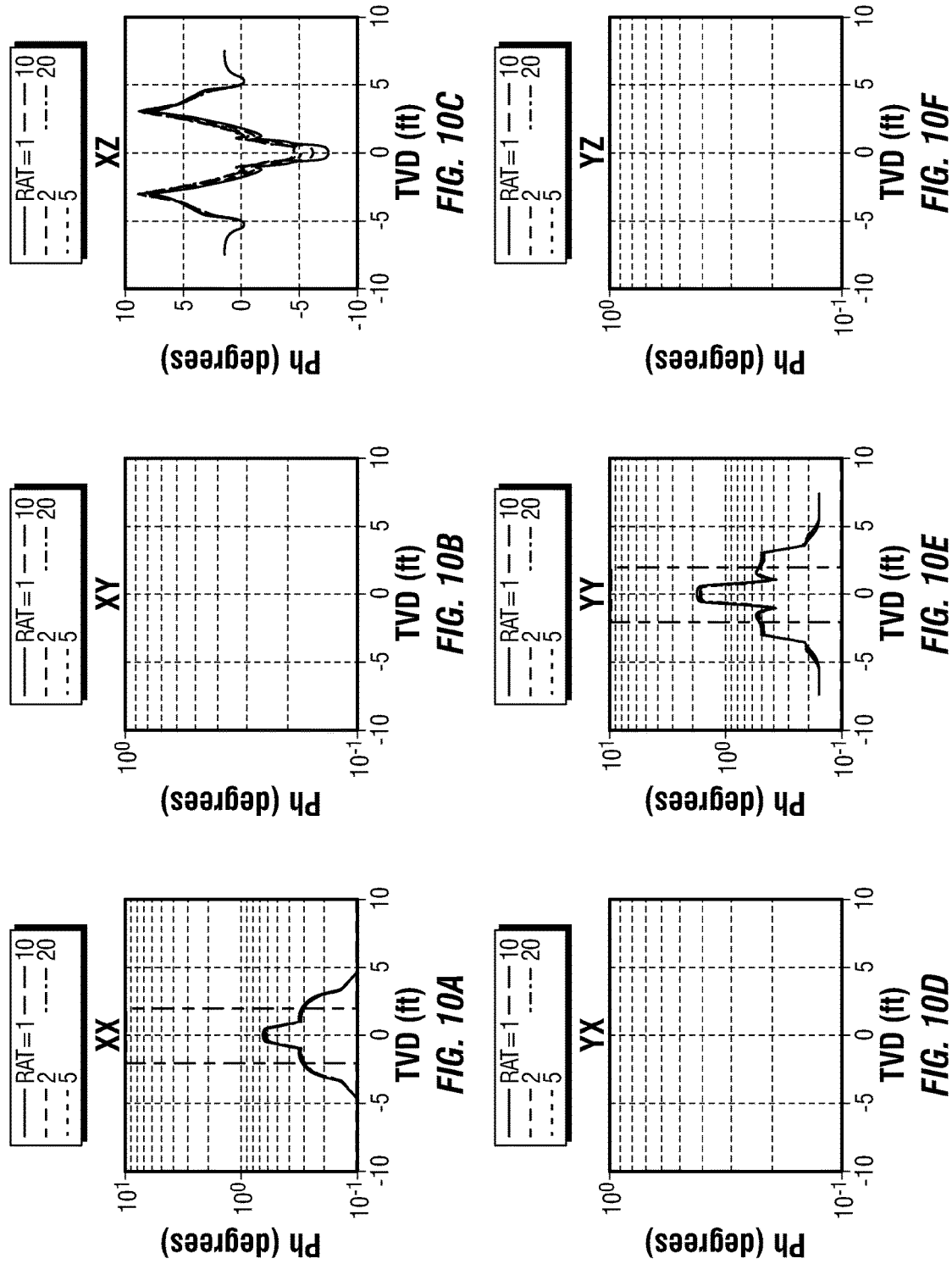

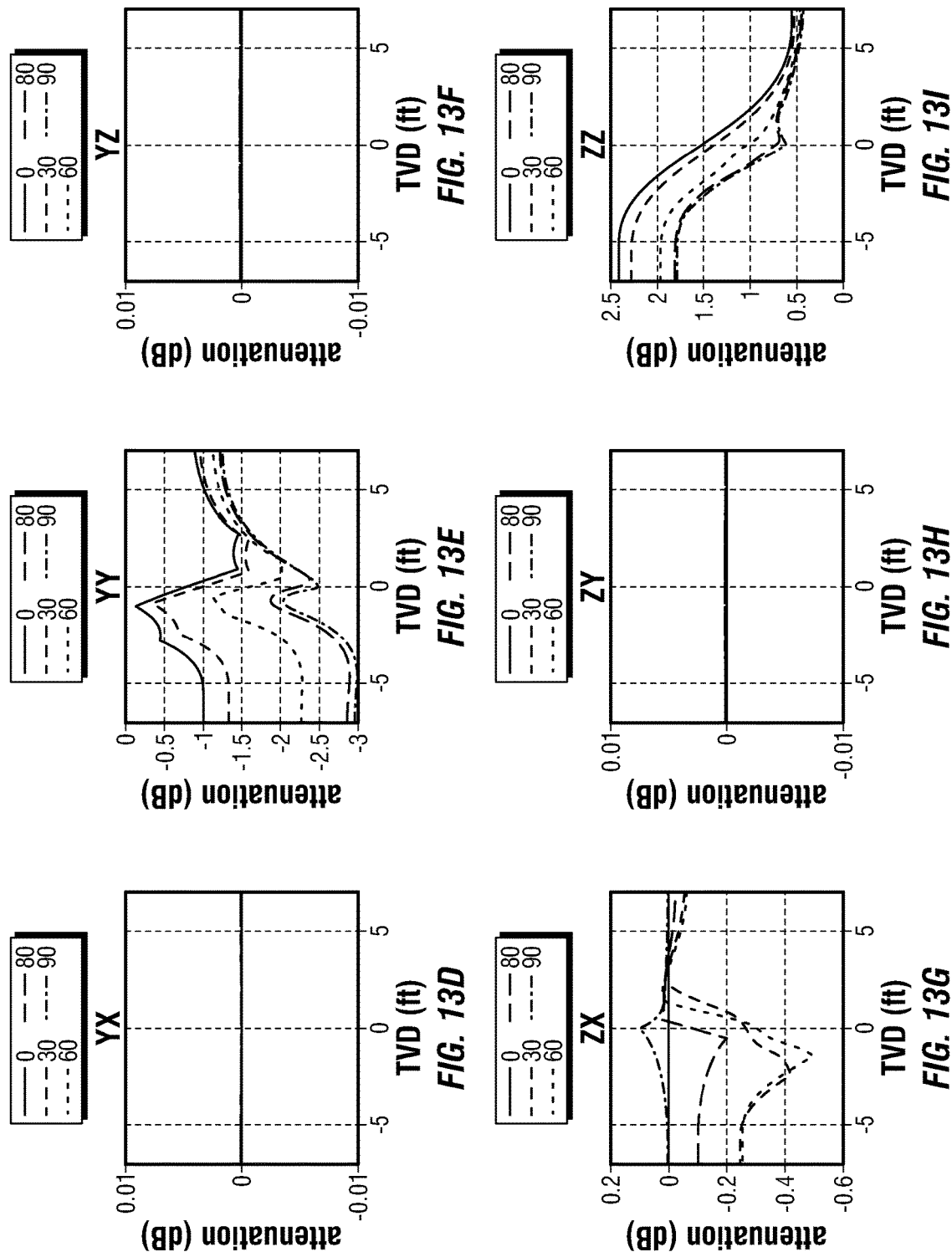

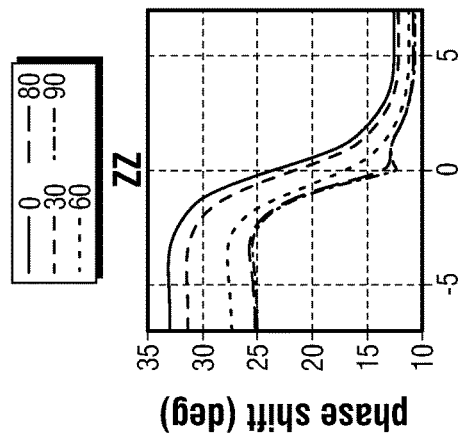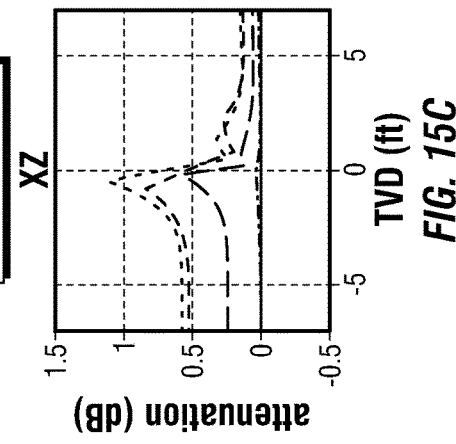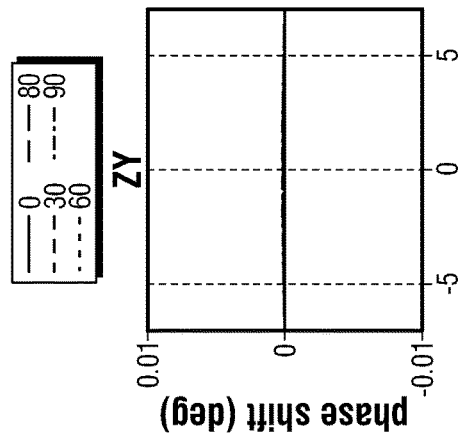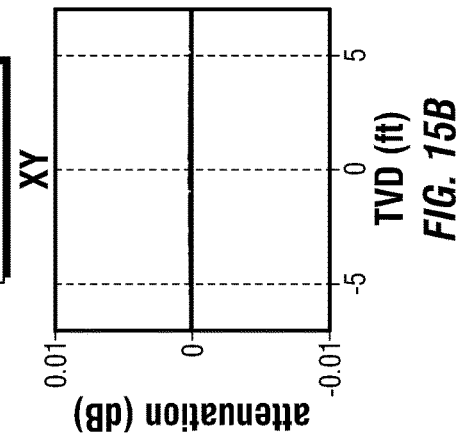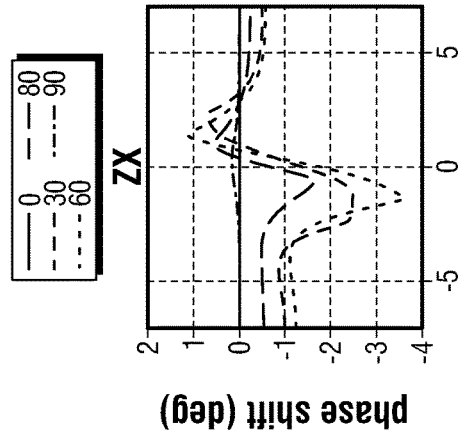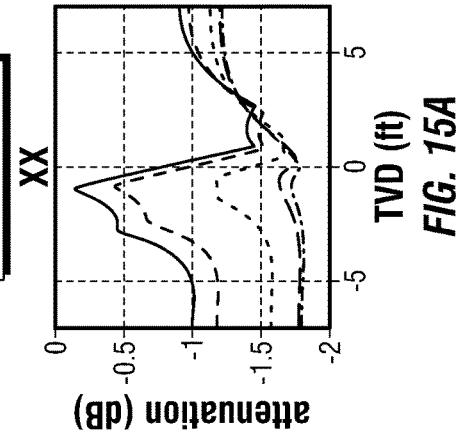

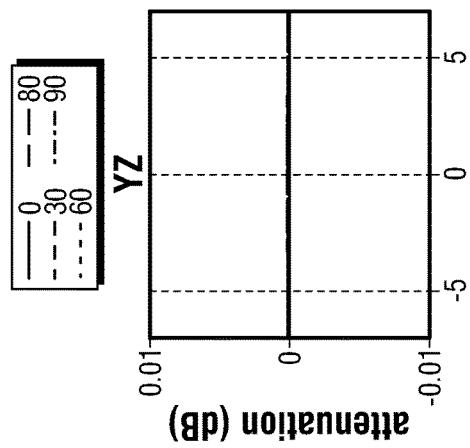
FIG. 15D
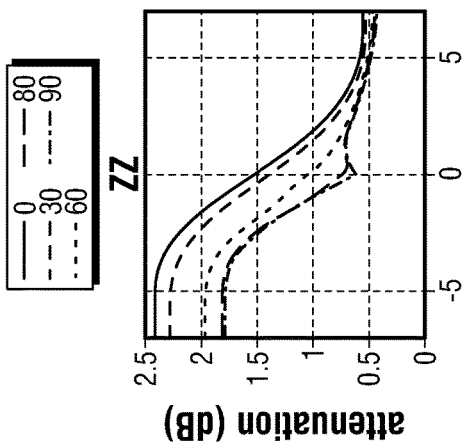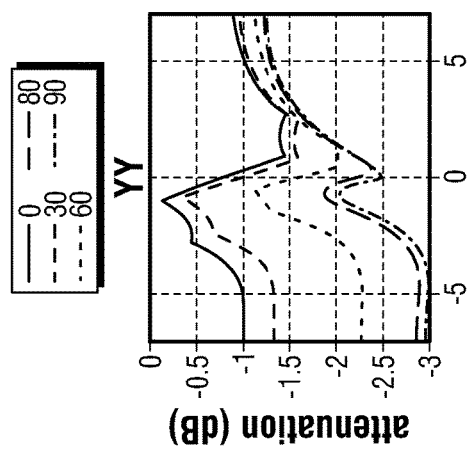
FIG. 15E
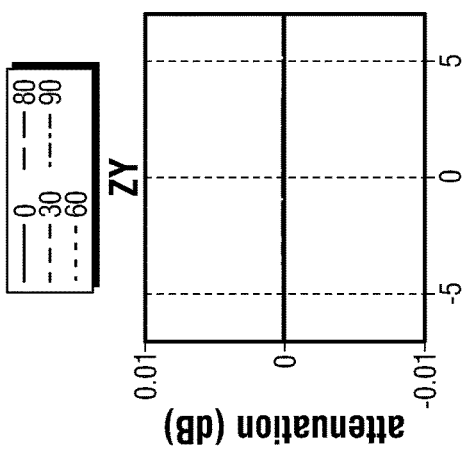
FIG. 15F
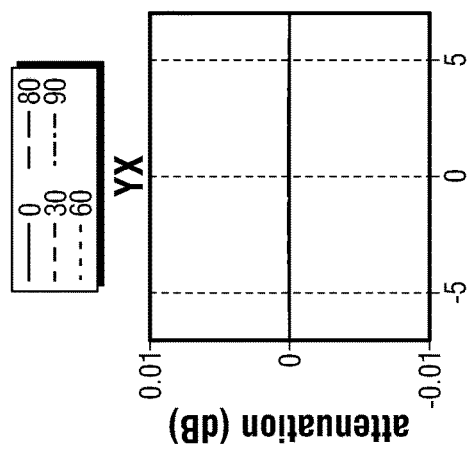
FIG. 15G
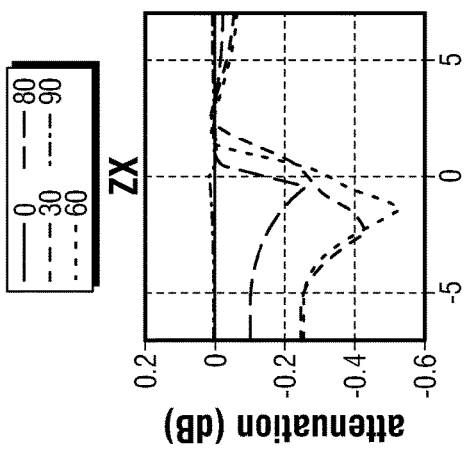
FIG. 15H
FIG. 15I

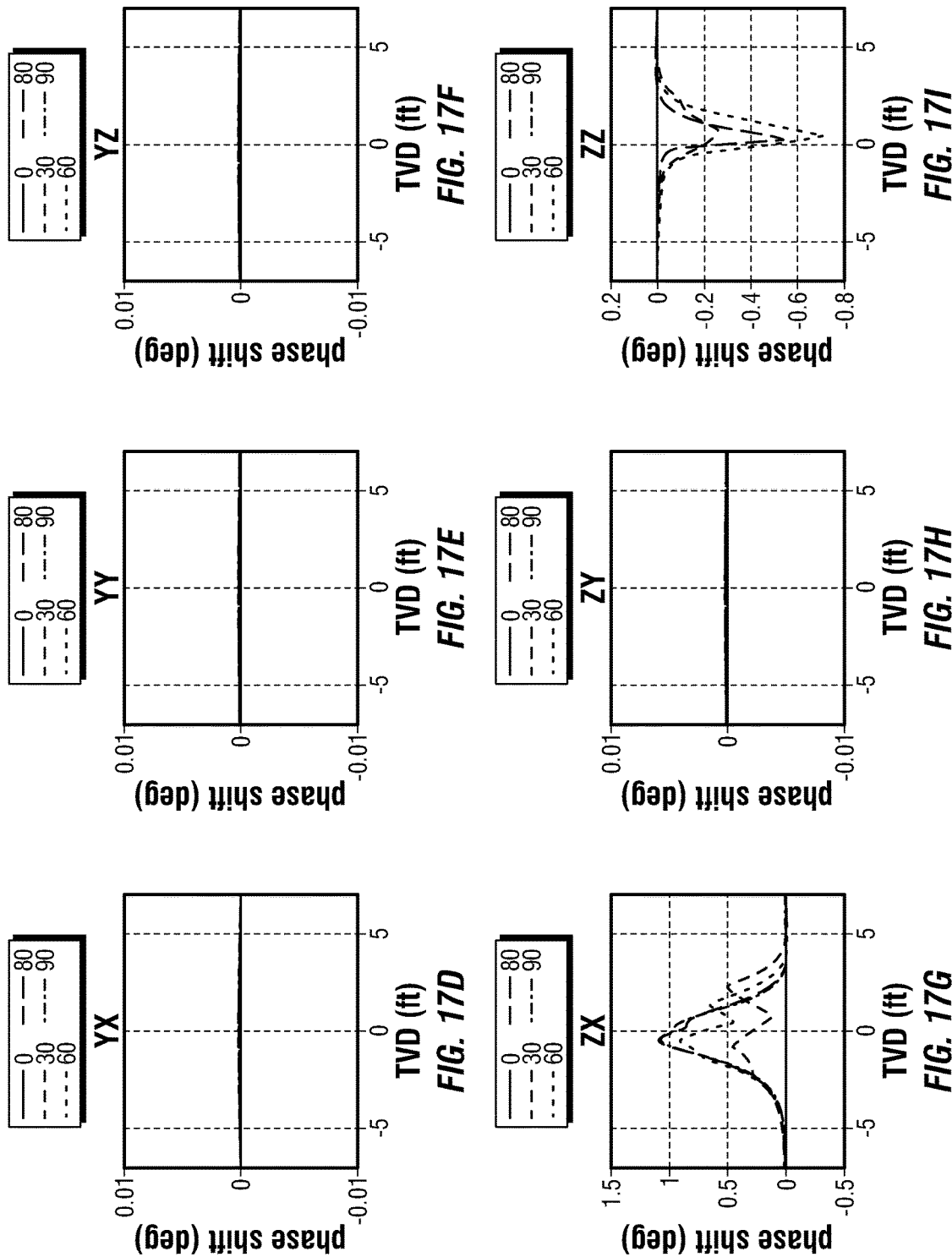

US 10,371,852 B2

FORMATION PROPERTIES FROM CONDUCTIVITY TENSOR

RELATED APPLICATIONS

N/A

BACKGROUND

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. By collecting and processing such information during the drilling process, the driller can modify or correct key steps of the operation to optimize performance.

MWD tools typically provide drilling parameter information such as weight on the bit, torque, temperature, pressure, direction, and inclination. LWD tools typically provide formation evaluation measurements such as resistivity, porosity, and NMR distributions. MWD and LWD tools often have components common to wireline tools (e.g., transmitting and receiving antennas), but MWD and LWD tools must be constructed to not only endure but to operate in the harsh environment of drilling. The terms MWD and LWD are often used interchangeably, and the use of either term in this disclosure will be understood to include both the collection of formation and wellbore information, as well as data on movement and placement of the drilling assembly.

Logging tools can also be used to image a wellbore. For example, measurements of resistivity, density, the photoelectric factor, natural gamma ray radiation, the dielectric constant, and acoustic impedance (e.g., ultrasonics) have been used to form wellbore images. Most, if not all, of those imaging methods are dependent on the type of drilling fluid ("mud") used.

SUMMARY

A logging tool having a plurality of spatially separated antennas is provided and used to make propagation-style measurements in a formation. Tensors are formed using the propagation-style measurements and one or more quantities are computed using the tensors. A formation evaluation is performed using the computed quantities. The formation evaluation determines a formation property or parameter such as horizontal resistivity, vertical resistivity, relative dip, azimuthal dip, bed boundary location, or bed thickness. The computed quantities may include compensated phase shift resistivity, compensated attenuation resistivity, symmetrized phase shift resistivity, symmetrized attenuation resistivity, anti-symmetrized phase shift resistivity, and anti-symmetrized attenuation resistivity. The measurements may be corrected for antenna gain errors and an air calibration may be performed. A zero-dimension inversion (meaning an inversion using an infinite, homogeneous, anisotropic, dipping formation model) may be performed, while drilling, using a downhole processor and the measurements, and, for example, the determined horizontal resistivity, vertical resistivity, relative dip, and/or azimuthal dip information may be sent to an uphole processor in real-time. This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of a borehole imaging and formation evaluation logging-while-drilling tool are described with reference to the following figures. The same numbers are generally used throughout the figures to reference like features and components.

FIG. 2 shows a prior art electromagnetic logging tool.

FIG. 3 schematically shows an embodiment of a propagation tool having a plurality of triaxial antennas, in accordance with the present disclosure.

FIG. 4 is a plot of the compensated phase shift response versus toolface angle for each of the nine couplings, in accordance with the present disclosure.

FIG. 5 is a plot of the compensated attenuation response versus toolface angle for each of the nine couplings, in accordance with the present disclosure.

Figure 6G:
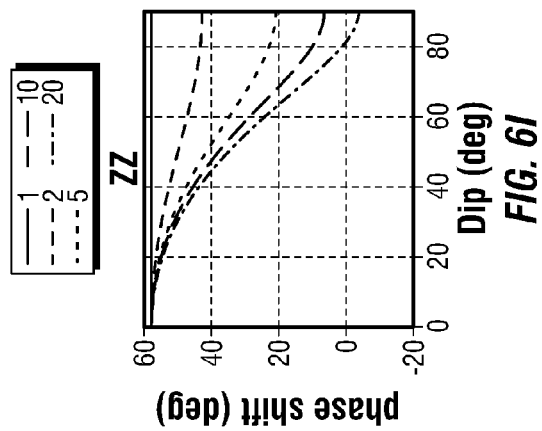
Figure 6H:
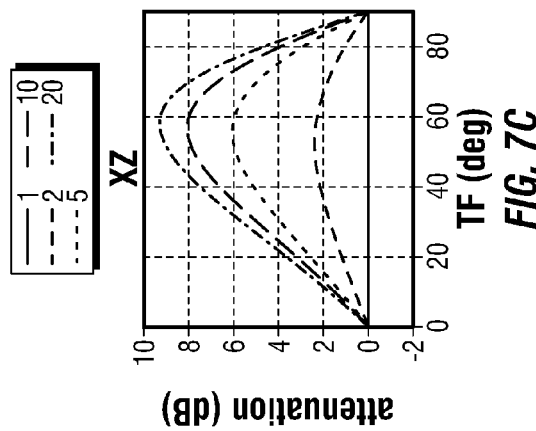
Figure 6I:
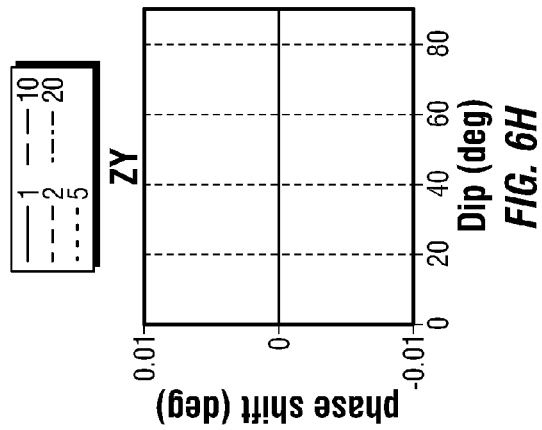
Figure 7A:
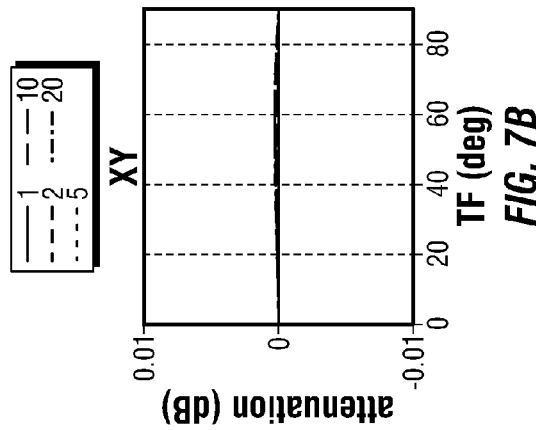
Figure 7B:
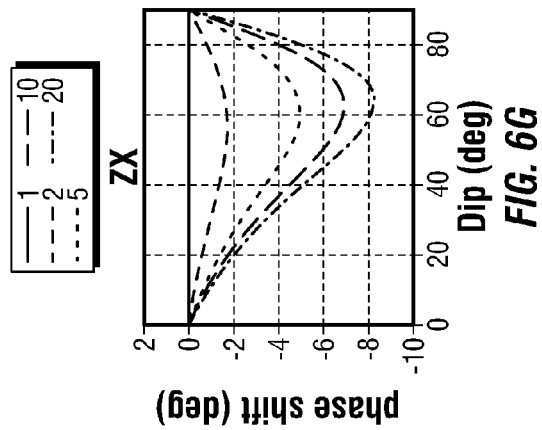
Figure 7C:
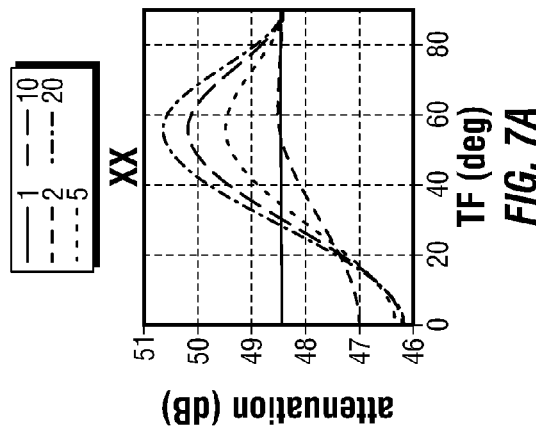
Figure 7D:
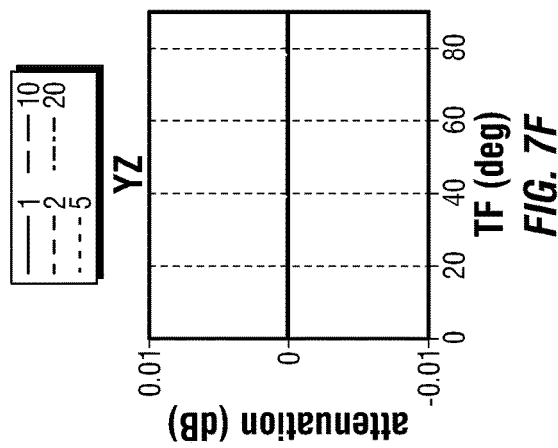
Figure 7E:
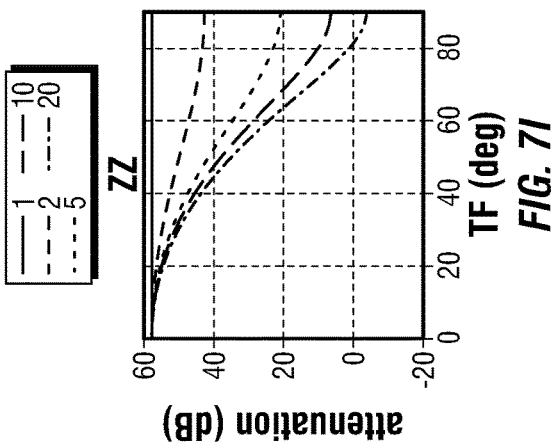
Figure 7F:
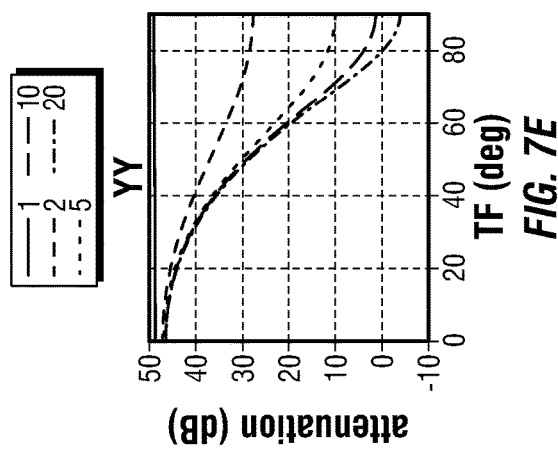
Figure 7G:
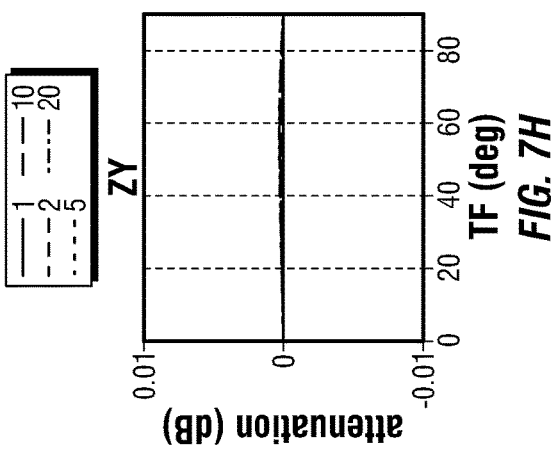
Figure 7H:
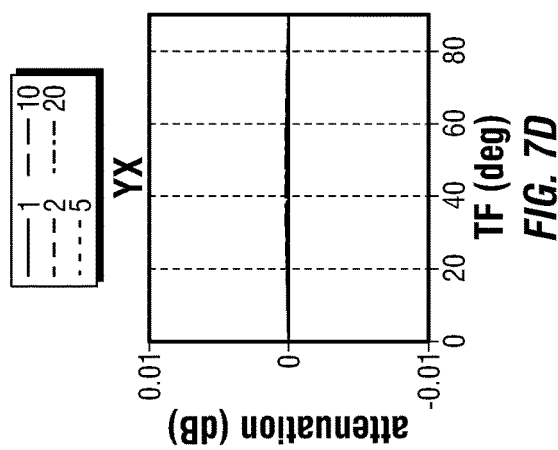
Figure 7I:
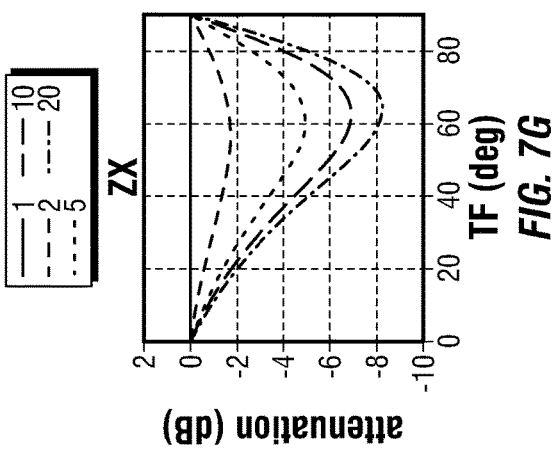

FIG. 6 is a plot of the compensated phase shift response versus relative dip angle for each of the nine couplings, in accordance with the present disclosure.

FIG. 7 is a plot of the compensated attenuation response versus relative dip angle for each of the nine couplings, in accordance with the present disclosure.

Figure 8:
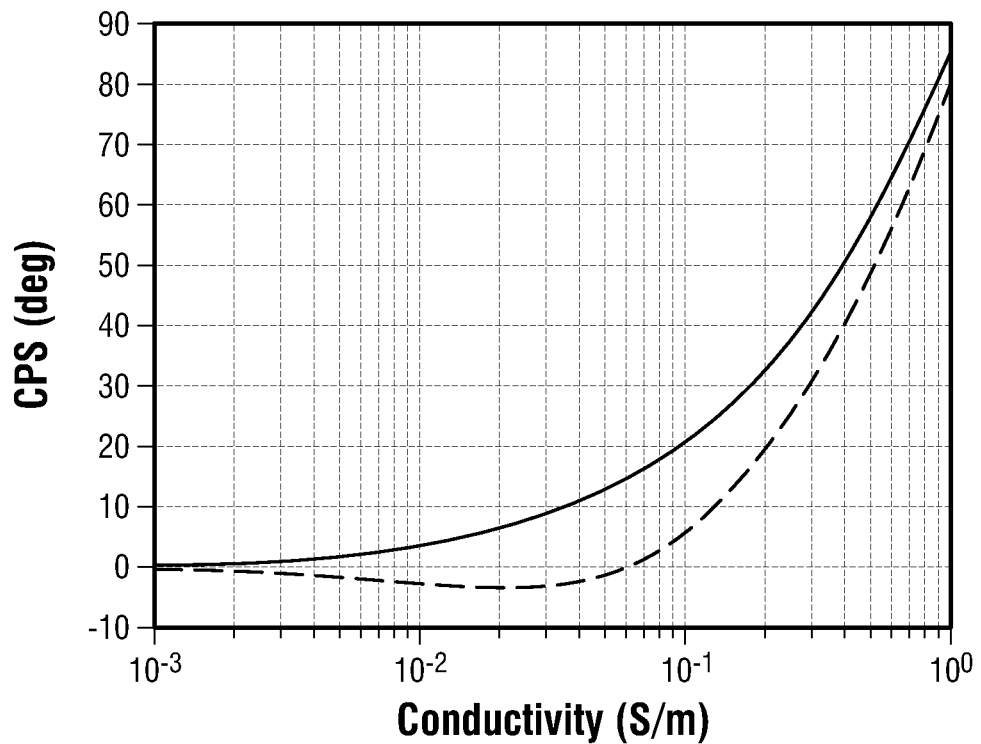

FIG. 8 is a plot of the compensated phase shift response versus conductivity for a homogeneous, isotropic formation, in accordance with the present disclosure.

Figure 9:
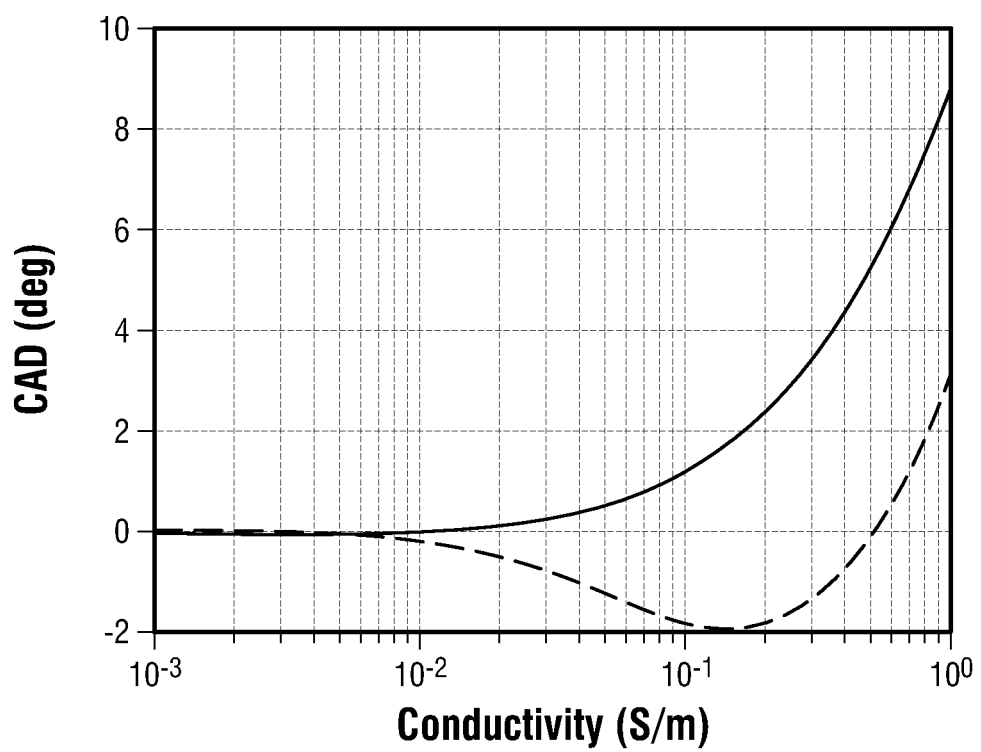

FIG. 9 is a plot of the compensated attenuation response versus conductivity for a homogeneous, isotropic formation, in accordance with the present disclosure.

Figure 10I:
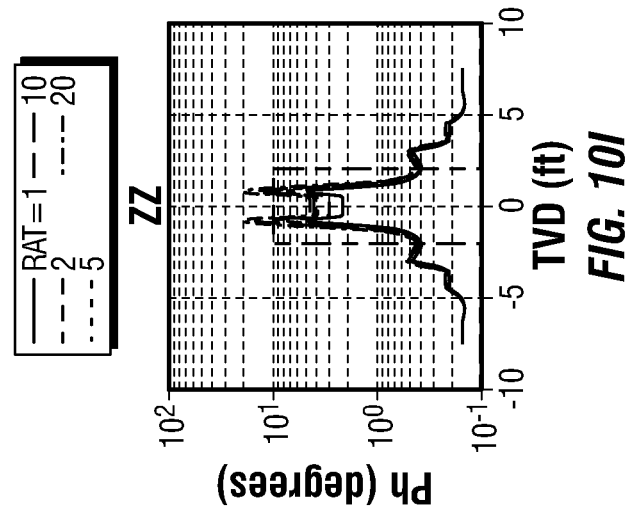
Figure 10H:
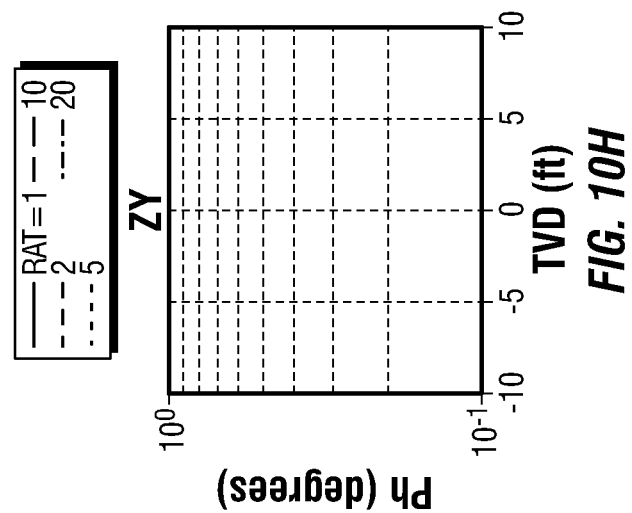
Figure 10G:
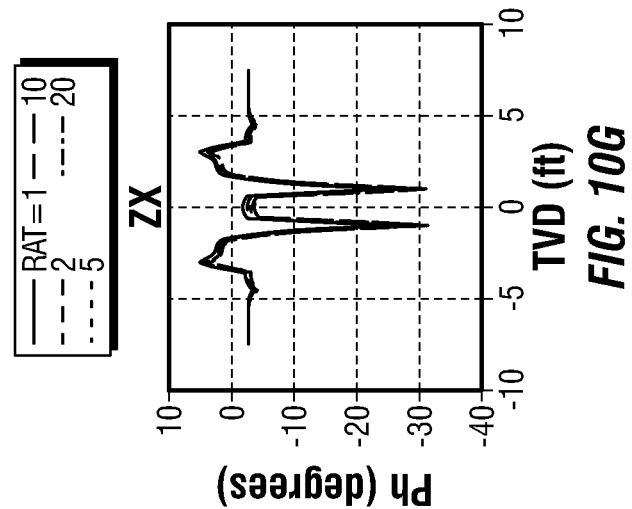

FIG. 10 is a plot, for each coupling, of the phase resistivity of a formation with a three foot bed thickness versus the log depth, for five different anisotropic ratios, in accordance with the present disclosure.

Figure 11:
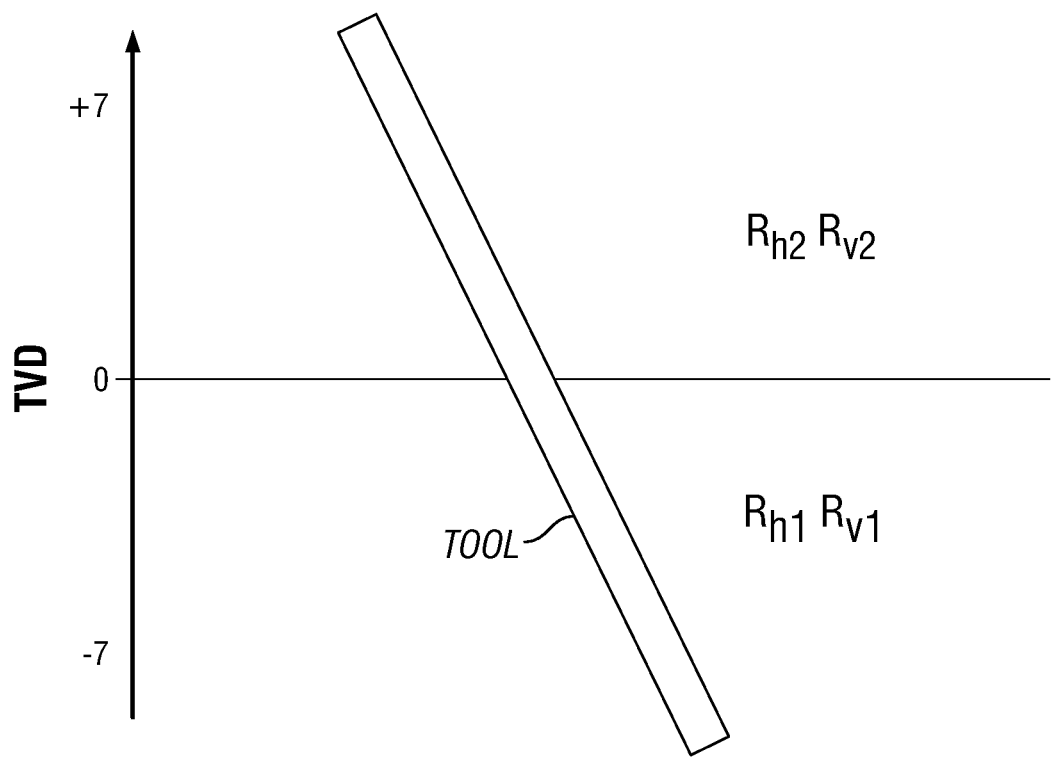
Figure 12A:
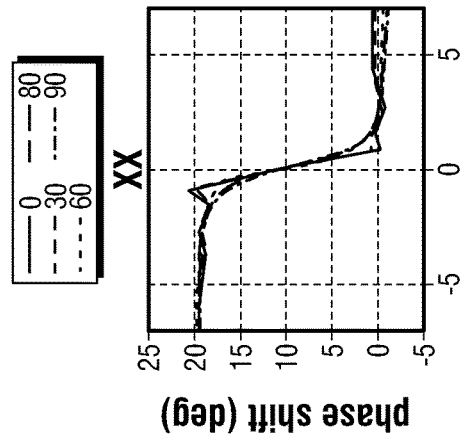
Figure 12B:
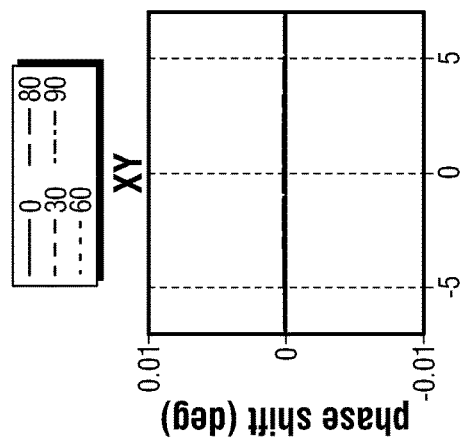
Figure 12C:
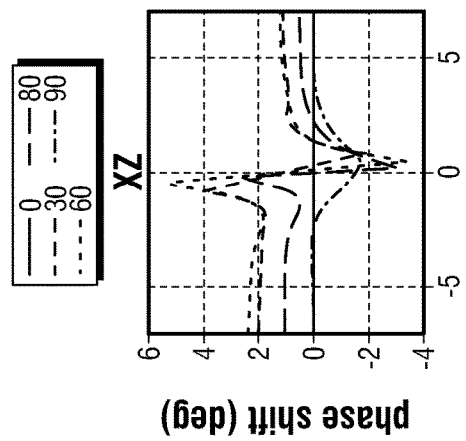
Figure 12D:
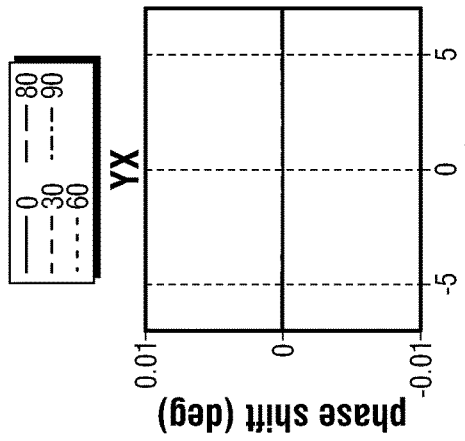
Figure 12E:
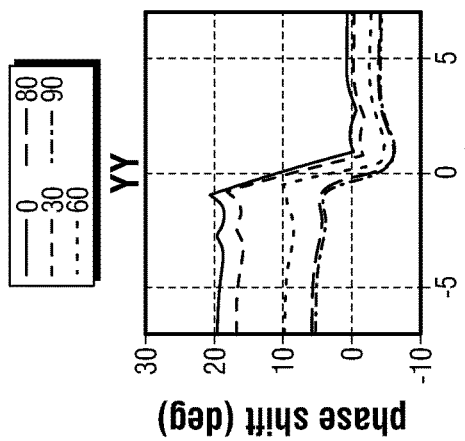
Figure 12F:
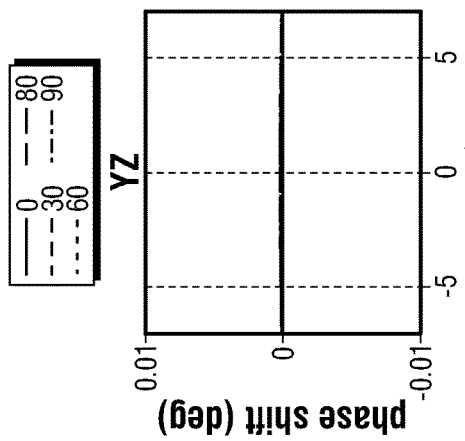
Figure 12G:
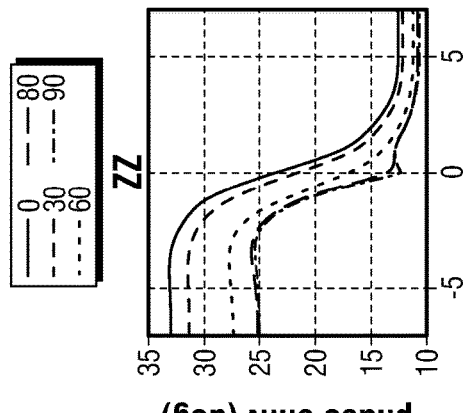
Figure 12H:
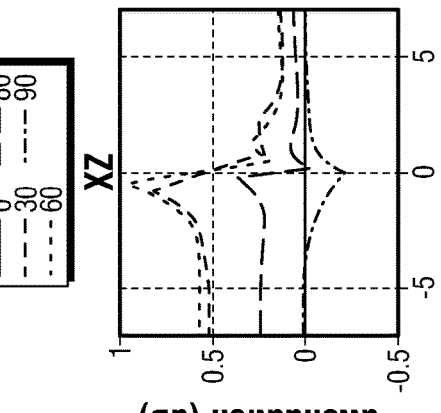
Figure 12I:
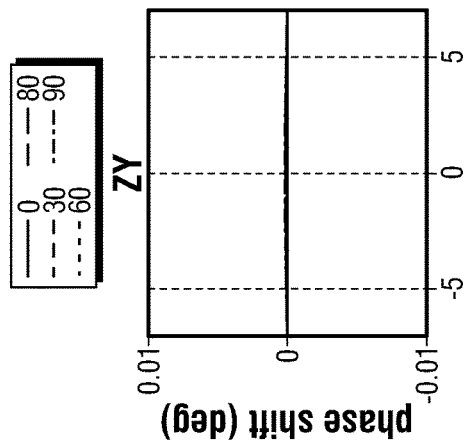

FIG. 11 is a schematic representation of an example layered formation having particular horizontal and vertical resistivities, in accordance with the present disclosure.

FIG. 12 is a plot of the compensated phase shift response versus true vertical depth for each of the nine couplings, in accordance with the present disclosure.

Figure 13A:
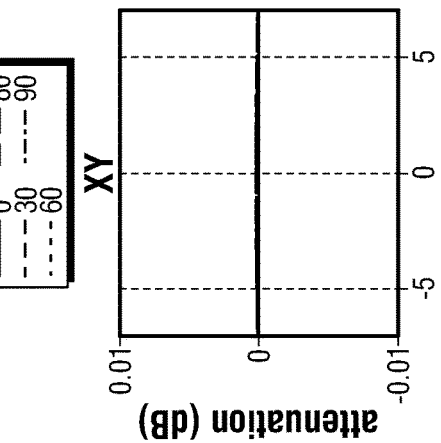
Figure 13B:
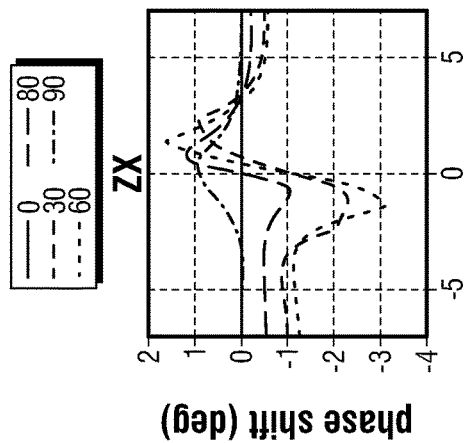
Figure 13C:
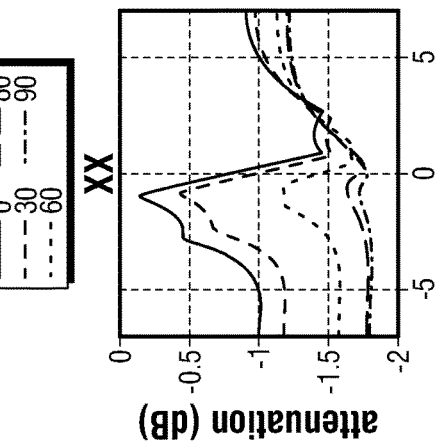
Figure 14C:
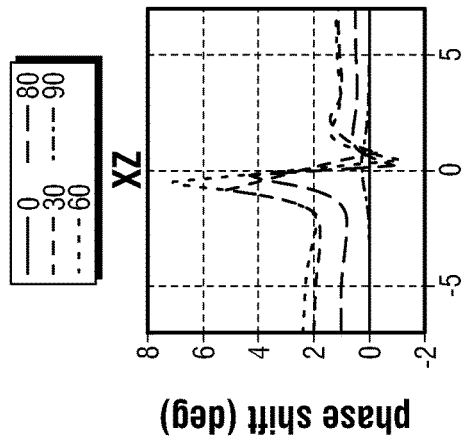
Figure 14F:
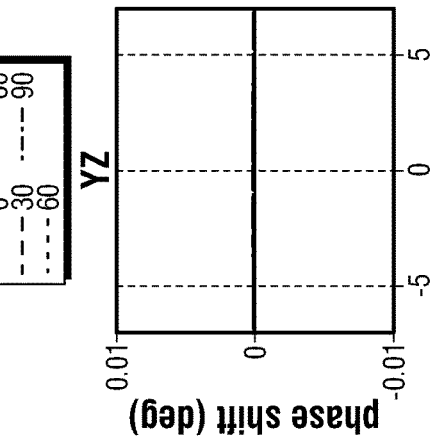
Figure 14B:
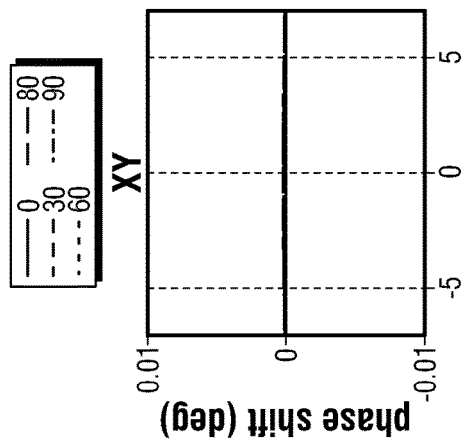
Figure 14E:
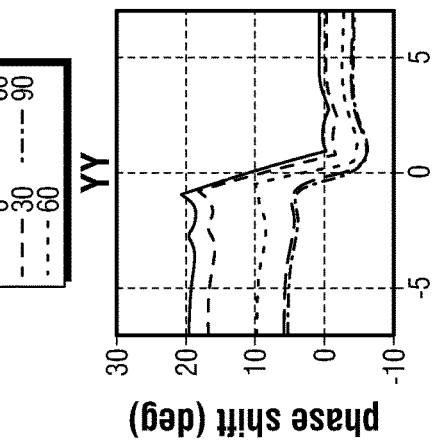
Figure 14A:
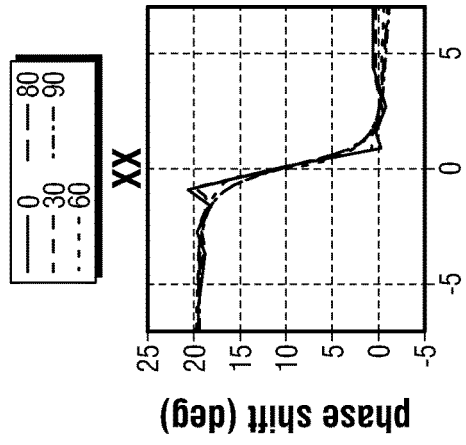
Figure 14D:
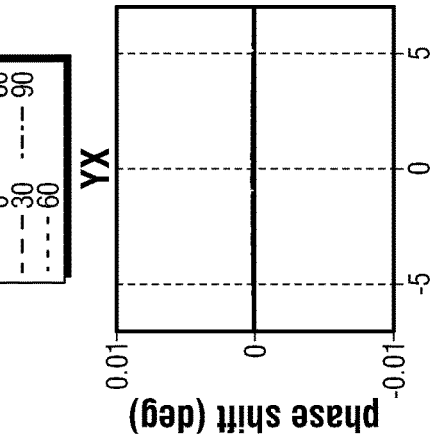
Figure 16A:
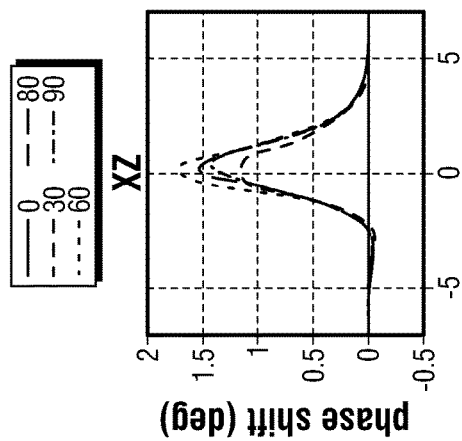
Figure 16B:
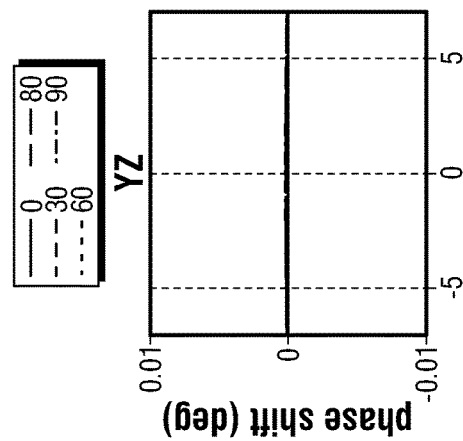
Figure 16C:
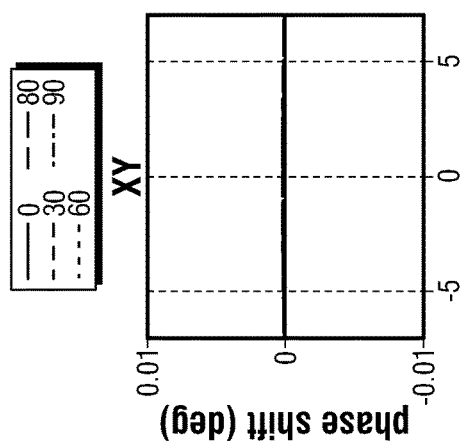
Figure 16D:
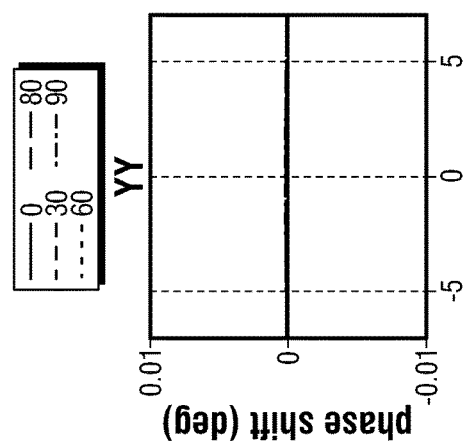
Figure 16E:
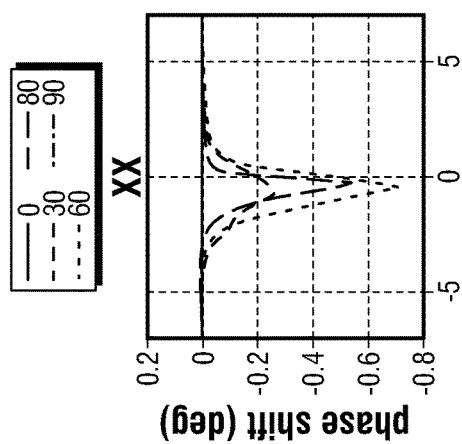
Figure 16F:
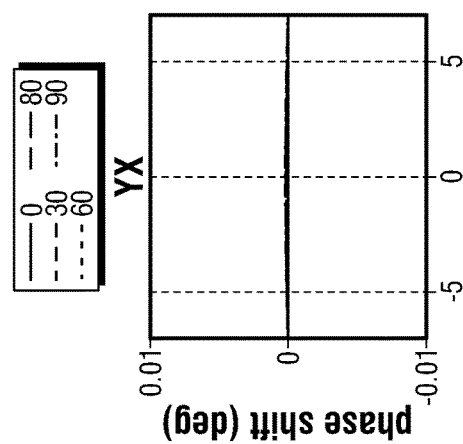
Figure 16G:
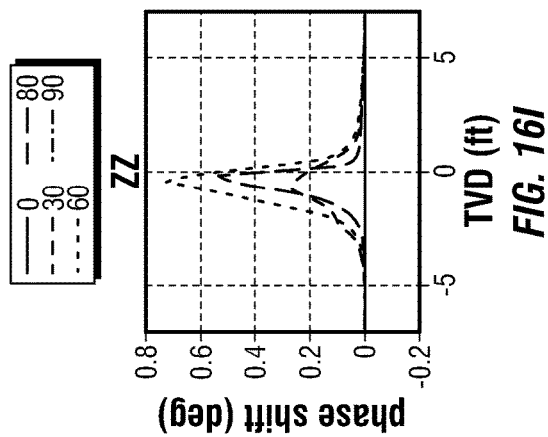
Figure 16H:
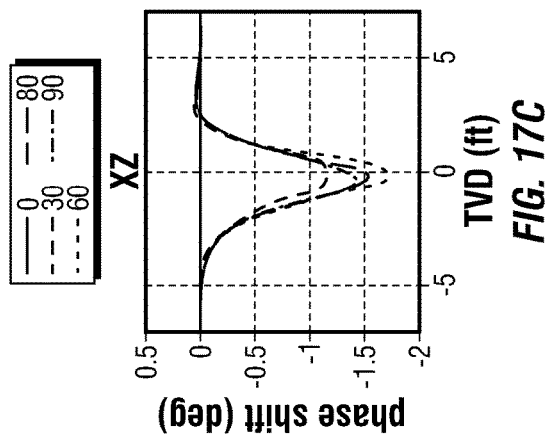
Figure 16I:
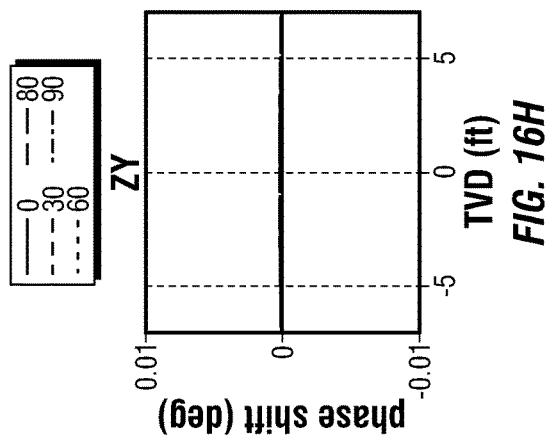

FIG. 13 is a plot of the compensated attenuation response versus true vertical depth for each of the nine couplings, in accordance with the present disclosure.

FIG. 14 is a plot of the anti-symmetrized phase shift response versus true vertical depth for each of the nine couplings, in accordance with the present disclosure.

FIG. 15 is a plot of the anti-symmetrized attenuation response versus true vertical depth for each of the nine couplings, in accordance with the present disclosure.

FIG. 16 is a plot of the symmetrized phase shift response versus true vertical depth for each of the nine couplings, in accordance with the present disclosure.

Figure 17A:
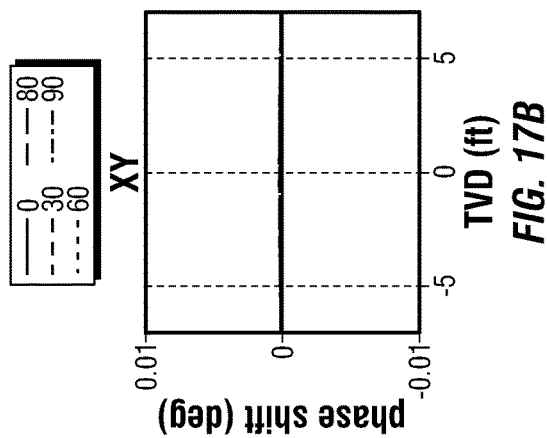
Figure 17B:
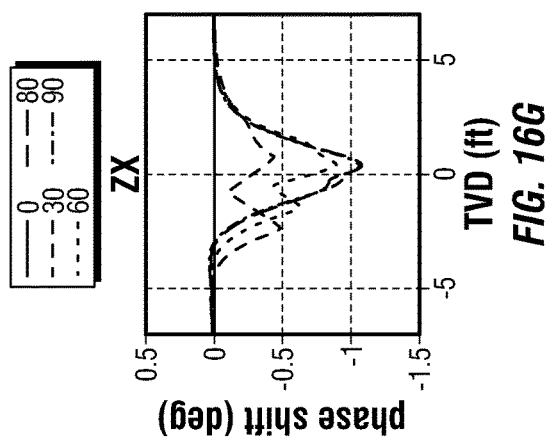
Figure 17C:
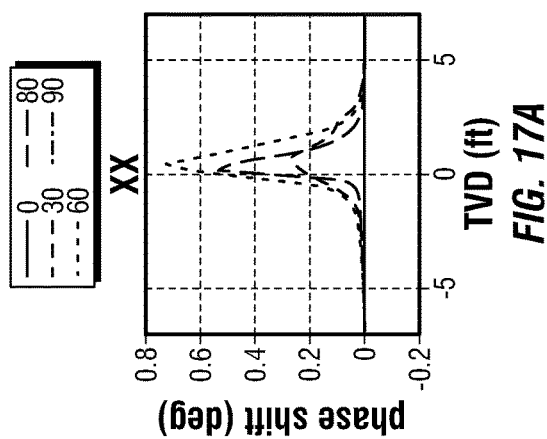

FIG. 17 is a plot of the symmetrized attenuation response versus true vertical depth for each of the nine couplings, in accordance with the present disclosure.

Figure 18:
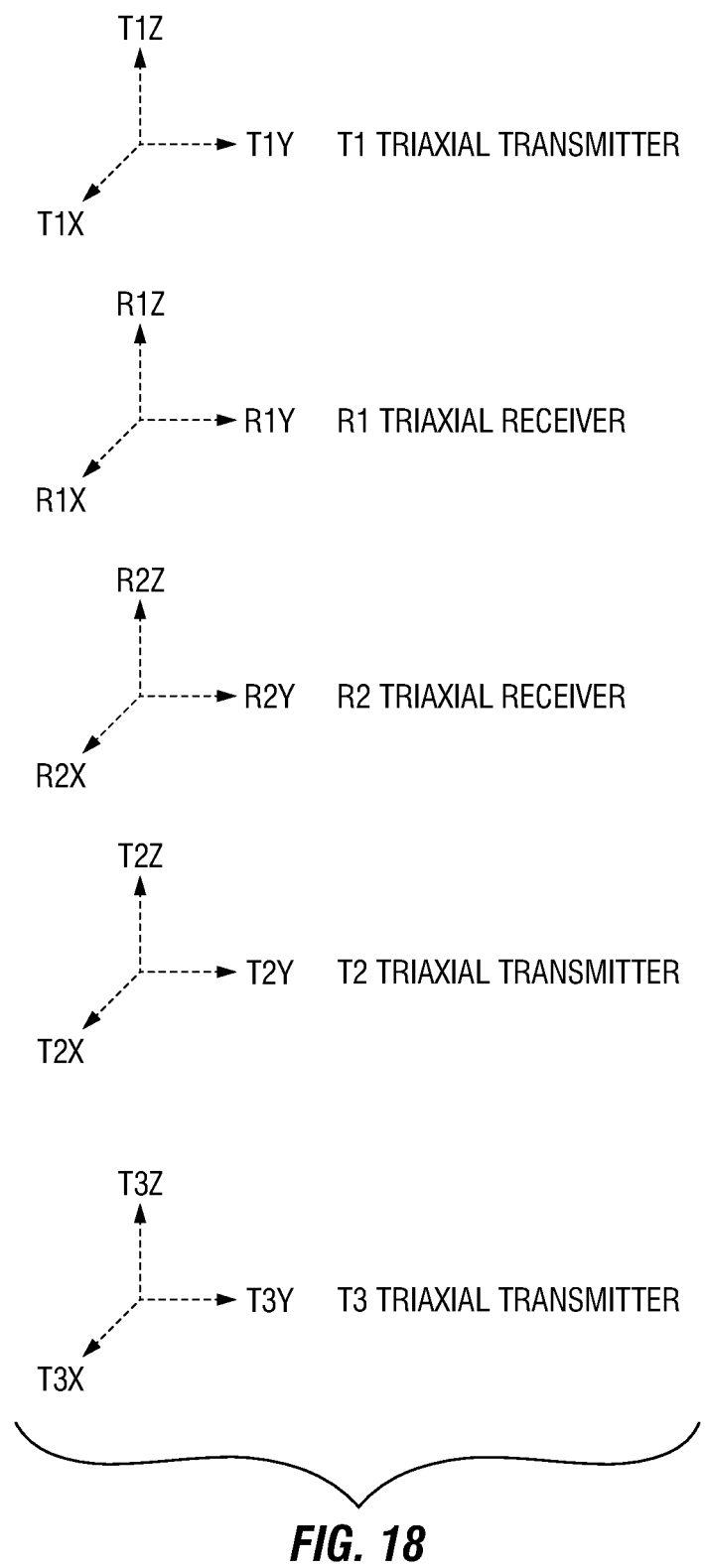

FIG. 18 schematically shows an alternative embodiment of a propagation tool having a plurality of triaxial antennas, in accordance with the present disclosure.

Figure 19:
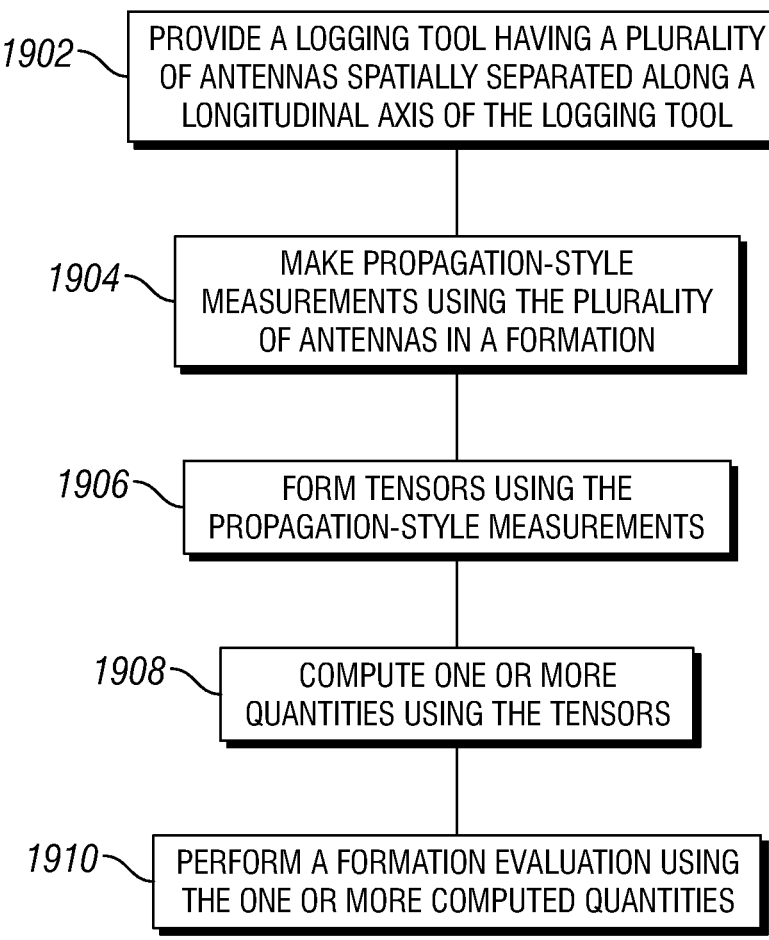

FIG. 19 is a flowchart showing an embodiment in accordance with the present disclosure.

Figure 20:
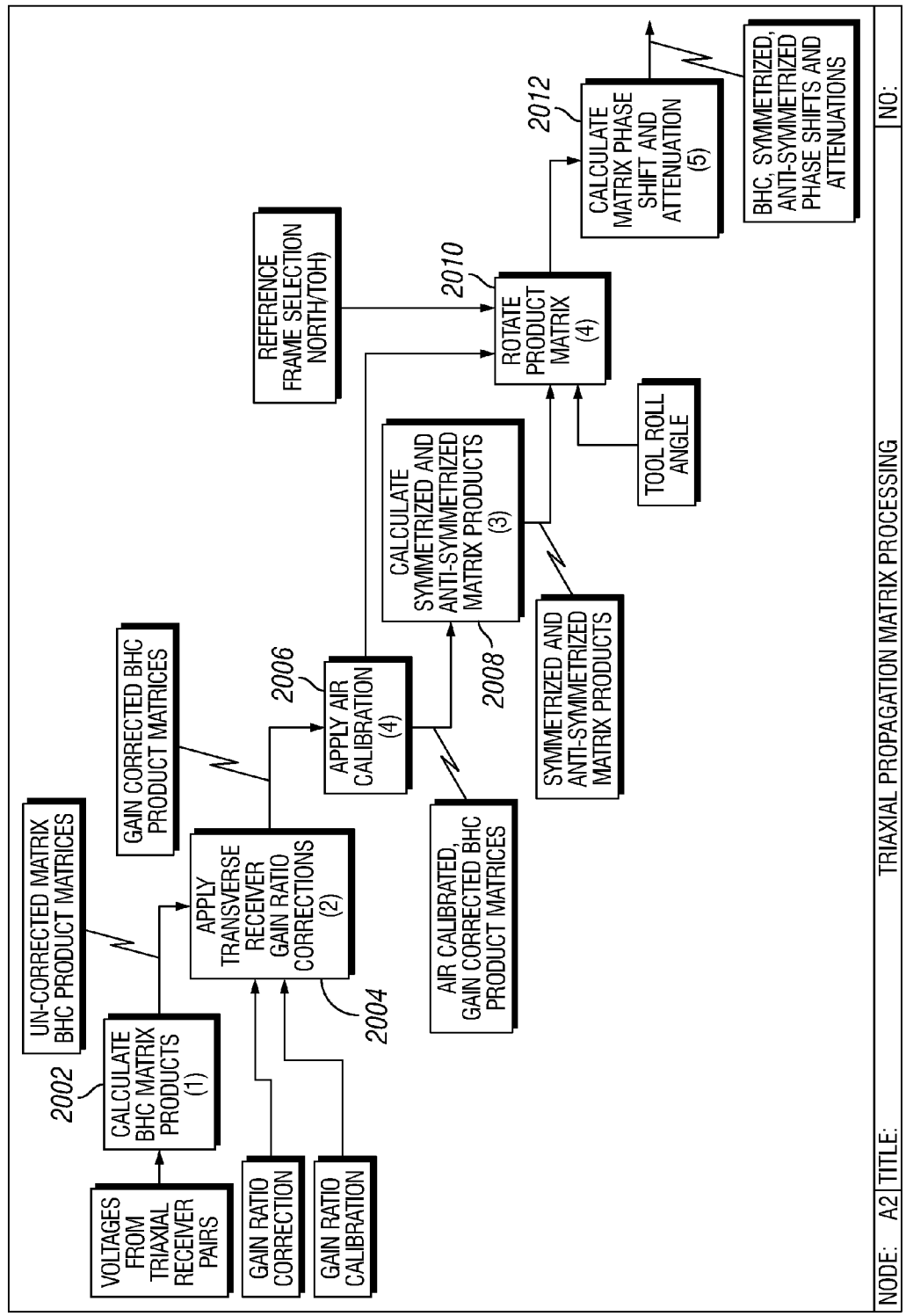

FIG. 20 shows a flowchart of an alternate embodiment in accordance with the present disclosure.

It should be understood that the drawings are not to scale and that the disclosed embodiments are sometimes illustrated diagrammatically and in partial views. In certain instances, details that are not necessary for an understanding of the disclosed method and apparatus or that would render other details difficult to perceive may have been omitted. It should be understood that this disclosure is not limited to the particular embodiments illustrated herein.

DETAILED DESCRIPTION

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate.

Figure 1:
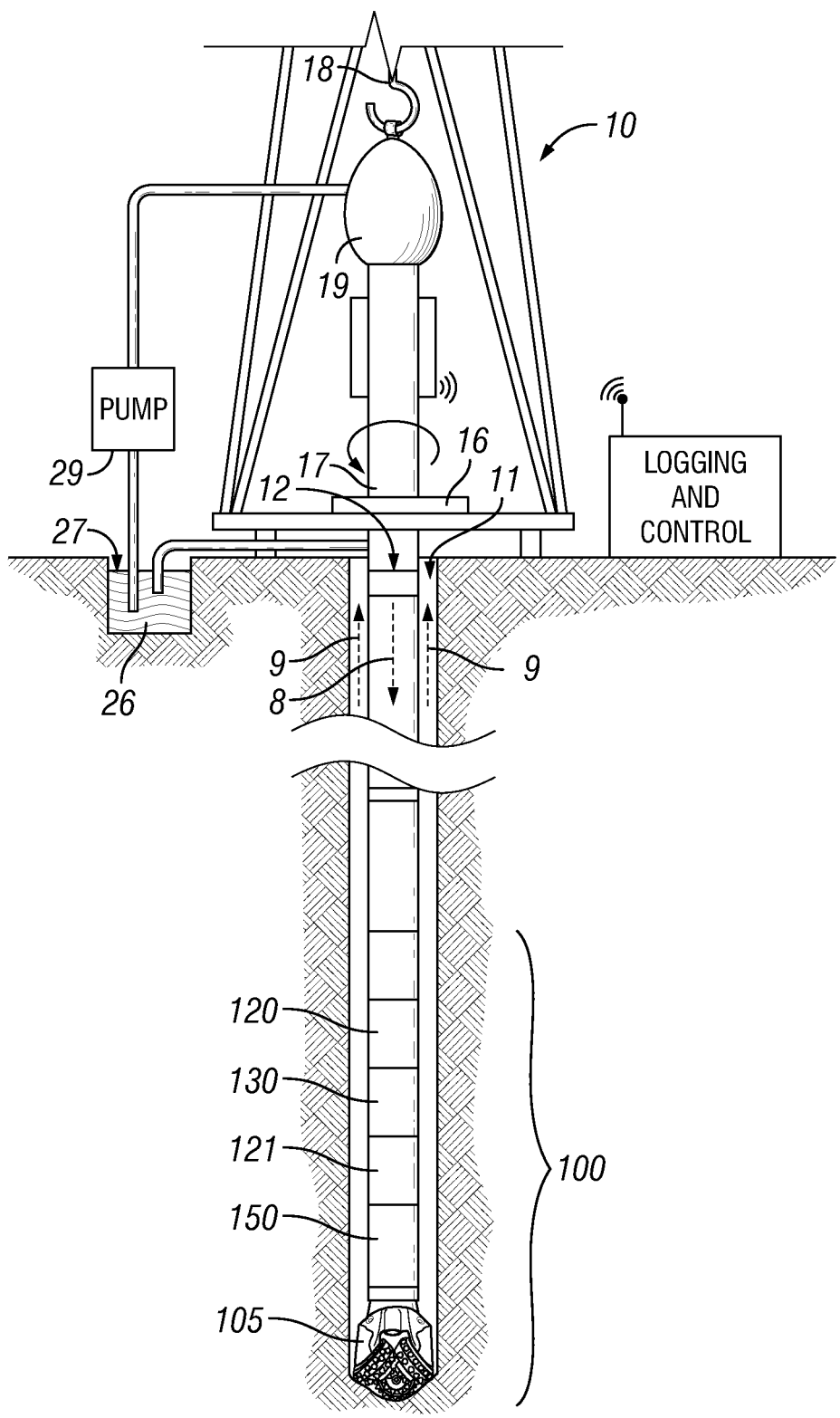
FIG. 1 illustrates a well site system.
Figure 4A:
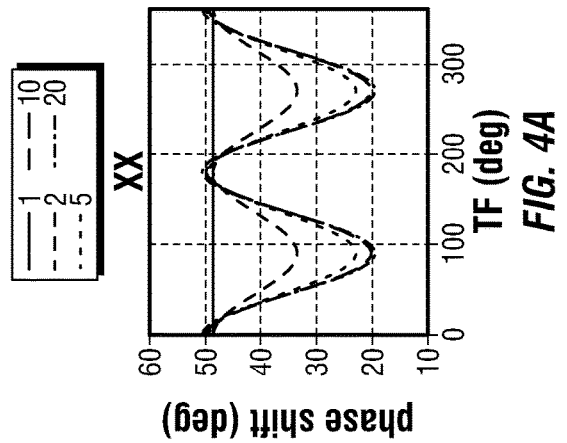
Figure 4B:
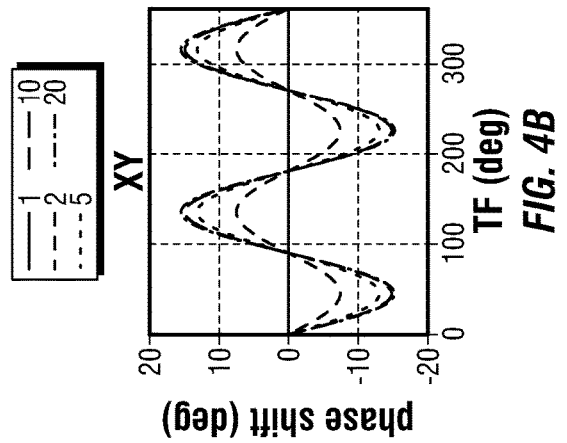
Figure 4C:
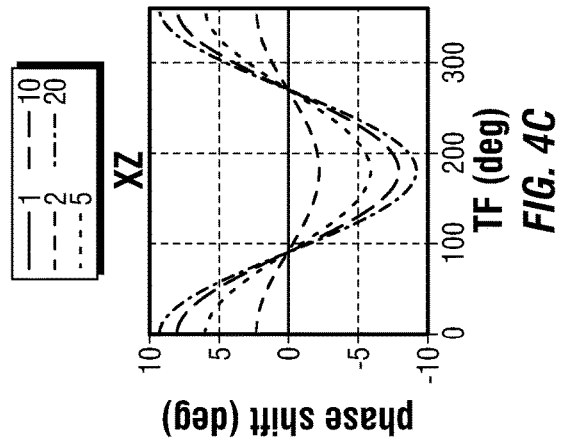
Figure 4D:
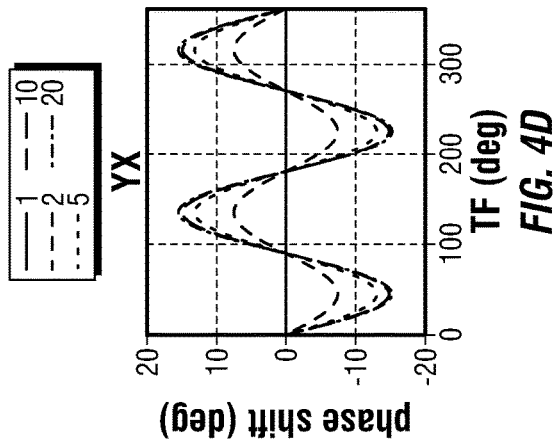
Figure 4E:
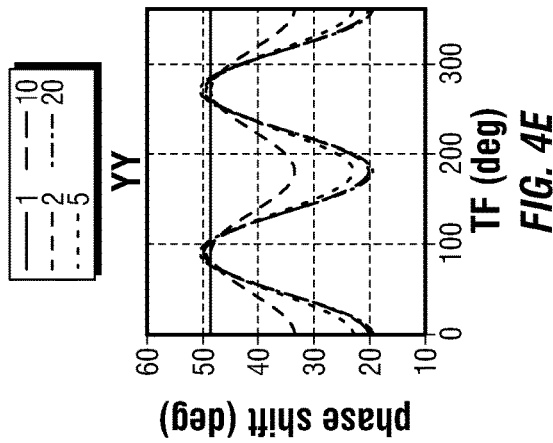
Figure 4F:
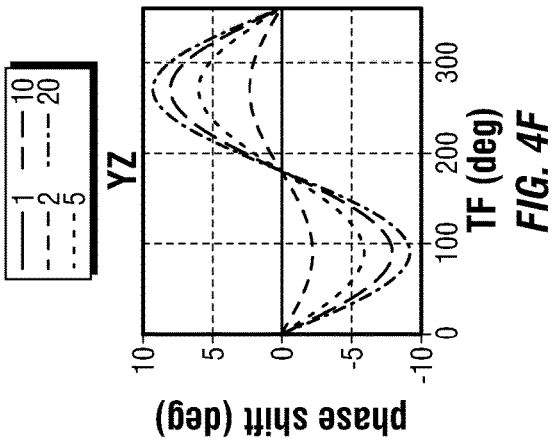
Figure 4G:
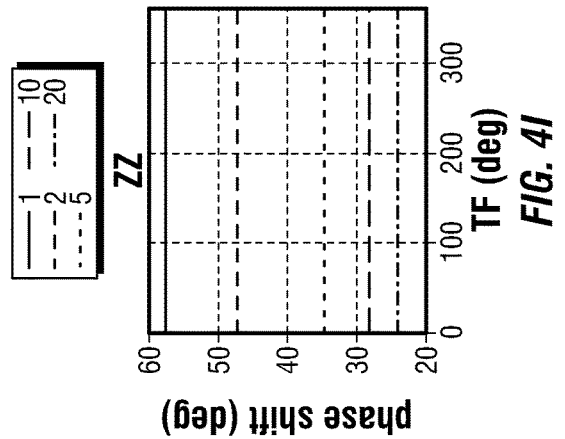
Figure 4H:
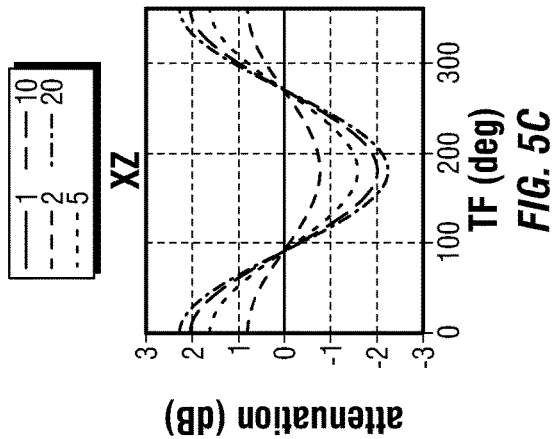
Figure 4I:
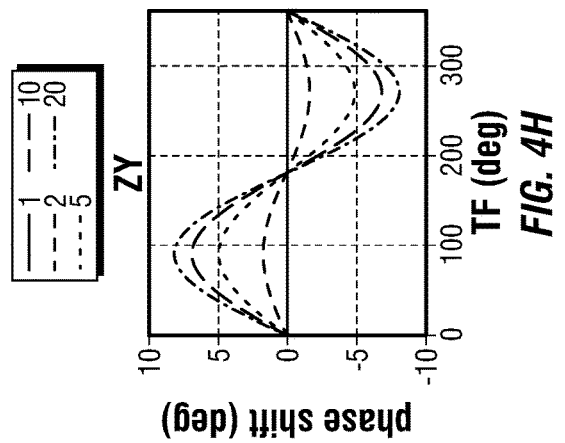
Figure 5A:
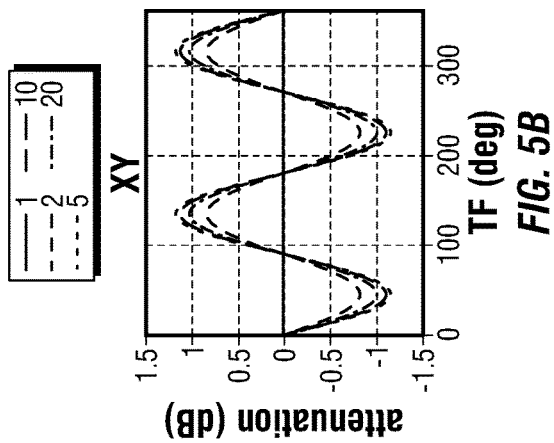
Figure 5B:
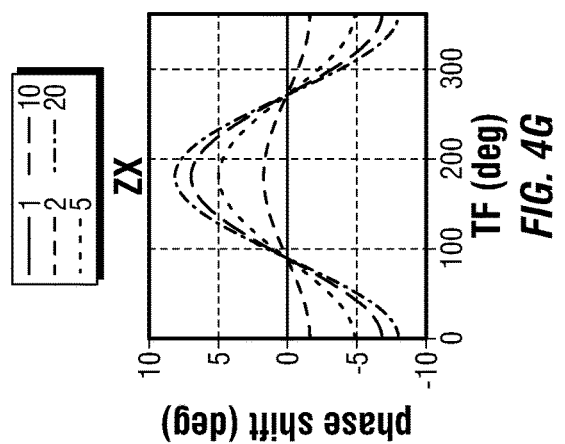
Figure 5C:
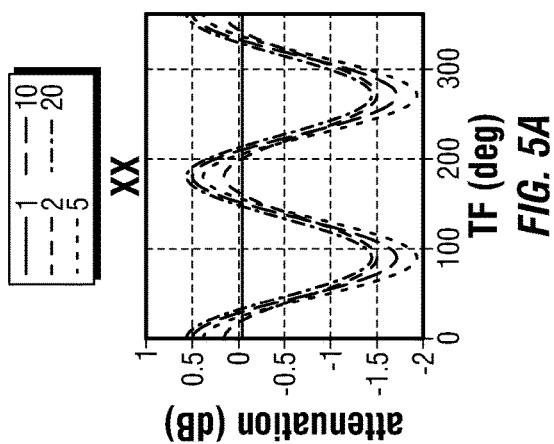
Figure 5D:
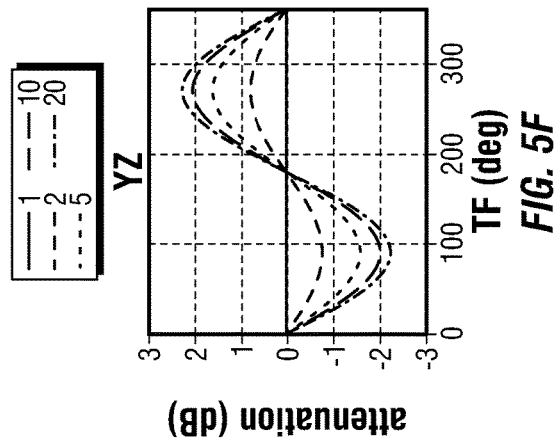
Figure 5E:
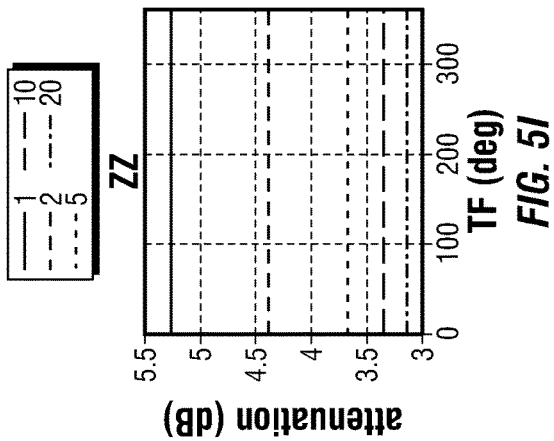
Figure 5F:
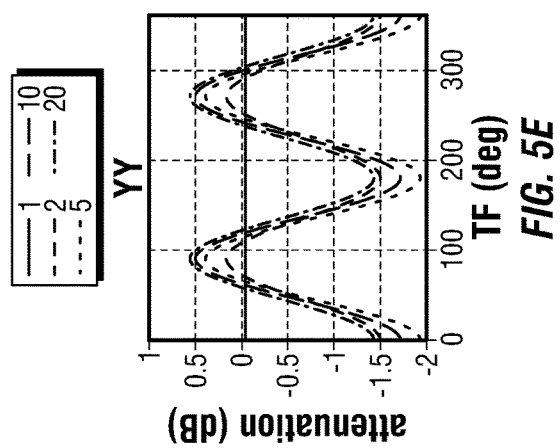
Figure 5G:
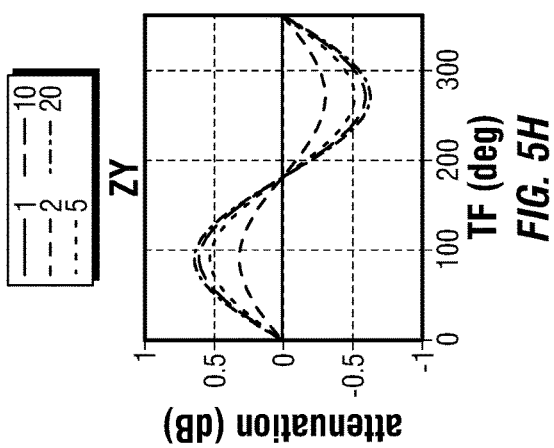
Figure 5H:
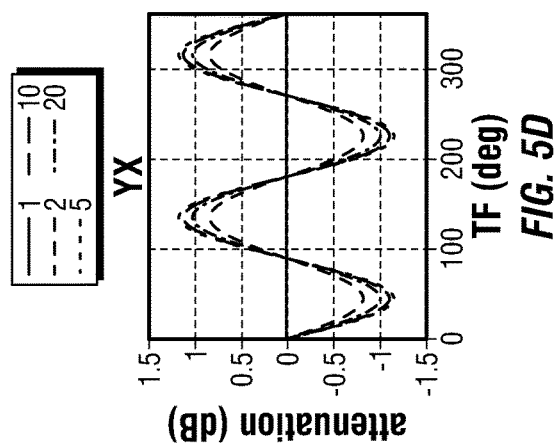
Figure 5I:
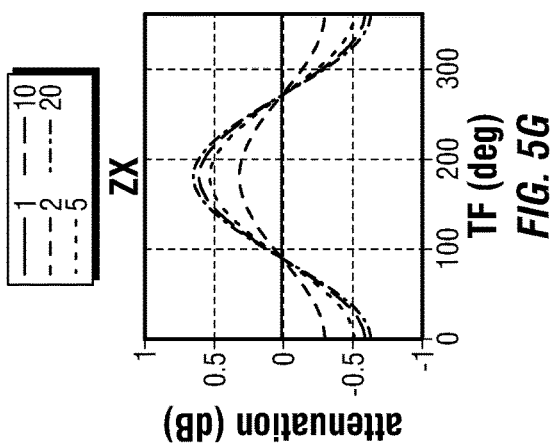

FIG. 1 illustrates a well site system in which various embodiments can be employed. The well site can be onshore or offshore. In this example system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a rotosteerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 121. (References, throughout, to a module at the position of 120 can alternatively mean a module at the position of 121 as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

An example of a tool which can be the LWD tool 120, or can be a part of an LWD tool suite 121, is shown in FIG. 2. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in MC or insulating material. The phase shift of the electromagnetic wave between the receivers provides an indication of formation resistivity at a relatively shallow depth of investigation, and the attenuation of the electromagnetic wave between the receivers provides an indication of formation resistivity at a relatively deep depth of investigation. U.S. Pat. No. 4,899,112 can be referred to for further details. In operation, attenuation-representative signals and phase-representative signals are coupled to a processor, an output of which is coupleable to a telemetry circuit.

Some electromagnetic (EM) logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. A triaxial antenna is one in which three antennas (i.e., antenna coils) are arranged to be mutually orthogonal. Often one antenna (coil) is axial and the other two are transverse. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

It is well known in the art that the resistivity and conductivity of a material are reciprocally related. That is, one is the reciprocal of the other. Thus, the terms "resistivity" and "conductivity" may be used interchangeably herein in the sense that wherever one appears it may be conceptually replaced with the corresponding reciprocal of the other.

A tool and method to obtain phase shift and attenuation information from propagation-style measurements made using an array of antennas, such as triaxial orthogonal antennas, are described herein. For ease of discussion triaxial antennas are discussed below, but that is not meant to be a limitation and any sort of measurement scheme that provides the full conductivity tensor, with or without tool rotation, may be used. Triaxial propagation measurements contain the formation information in the full conductivity tensor. Better results may be obtained if the antenna coils of a particular transmitter or receiver are co-located. By using the full tensor, borehole compensation may be extended to the triaxial measurements, as opposed to using the term-by-term or element-by-element prior art approach. No a priori assumptions need be made regarding the formation, and no constraints on dip angles or distances to bed boundaries need be made.

The induced voltage, $V_{induced}$, on a receiver coil is proportional to the current I in a transmitter coil:

$$V_{induced} = IZ.$$

Z is the transfer impedance, which depends on the electrical and magnetic properties of the environment surrounding the coil pair, the signal frequency, the coil geometry, and the coil spacing. The actual voltage measured, V, which can be affected by gain and phase errors of the transmitter and receiver antennas and electronics, can be written as:

$$V = g_T g_R Z$$

where $g_R$ is the unknown complex receiver gain and $g_T$ is the unknown complex transmitter gain, including the unmeasured transmitter current, I.

A propagation tool array such as the embodiment shown in FIG. 3 comprises two triaxial transmitters and two triaxial receivers. Each triaxial antenna comprises three antenna coils that are oriented such that the directions of their magnetic moments (denoted as arrows in the figure) are an orthogonal set. The antennas can be designed to operate at one or more frequencies. Note, the borehole compensation described herein is equally valid for non-orthogonal tilted coils. The voltage measured, for example, on the x-directed coil of Receiver 2 (R2x) induced by the current in the z-directed transmitter coil of Transmitter 1 (T1z) is:

$$V_{12zx} = g_{T1z} g_{R2x} Z_{12zx}.$$

Expressing the other coil combinations similarly, the voltages measured on each of the coils of the triaxial receiver can be written as a matrix, $$V_{12} = \begin{bmatrix} g_{T1x}g_{R2x}Z_{12xx} & g_{T1x}g_{R2y}Z_{12xy} & g_{T1x}g_{R2z}Z_{12xz} \\ g_{T1y}g_{R2x}Z_{12yx} & g_{T1y}g_{R2y}Z_{12yy} & g_{T1y}g_{R2z}Z_{12yz} \\ g_{T1z}g_{R2x}Z_{12zx} & g_{T1z}g_{R2y}Z_{12zy} & g_{T1z}g_{R2z}Z_{12zz} \end{bmatrix}.$$

This can be written more compactly as:

$$V_{12} = G_{T1} Z_{12} G_{R1}$$

where $Z_{12}$ is the transfer impedance tensor:

$$Z_{12} = \begin{bmatrix} Z_{12xx} & Z_{12xy} & Z_{12xz} \\ Z_{12yx} & Z_{12yy} & Z_{12yz} \\ Z_{12zx} & Z_{12zy} & Z_{12zz} \end{bmatrix},$$

and $G_{T1}$ and $G_{R2}$ are diagonal matrices of the transmitter and receiver coil gains, respectively:

$$G_{T1} = \begin{bmatrix} g_{T1x} & 0 & 0 \\ 0 & g_{T1y} & 0 \\ 0 & 0 & g_{T1z} \end{bmatrix},$$

$$G_{R2} = \begin{bmatrix} g_{R2x} & 0 & 0 \\ 0 & g_{R2y} & 0 \\ 0 & 0 & g_{R2z} \end{bmatrix}.$$

Transmitter 1 gains can be eliminated by taking the combination of voltages given by:

$$M_{12} = V_{11}^{-1} V_{12} = G_{R1}^{-1} Z_{11}^{-1} G_{T1}^{-1} G_{T1} Z_{12} G_{R2} = G_{R1}^{-1} Z_{11}^{-1} Z_{12} G_{R2}.$$

Similarly, Transmitter 2 gains can be eliminated using:

$$M_{21} = V_{22}^{-1} V_{21} = G_{R2}^{-1} Z_{22}^{-1} Z_{21} G_{R1}.$$

The combination:

$$M_{21} = M_{21} M_{12}$$
$$= G_{R2}^{-1} Z_{22}^{-1} Z_{21} Z_{11}^{-1} Z_{12} G_{R2}$$
$$= G_{R2}^{-1} U_{21} G_{R2}$$
$$= \begin{bmatrix} U_{21xx} & \frac{g_{R2y}}{g_{R2x}} U_{21xy} & \frac{g_{R2z}}{g_{R2x}} U_{21xz} \\ \frac{g_{R2x}}{g_{R2y}} U_{21yx} & U_{21yy} & \frac{g_{R2z}}{g_{R2y}} U_{21yz} \\ \frac{g_{R2x}}{g_{R2z}} U_{21zx} & \frac{g_{R2y}}{g_{R2z}} U_{21zy} & U_{21zz} \end{bmatrix}$$

produces a quantity in which the gain factors are fully eliminated from the diagonal terms (leaving only the diagonal elements of $U_{21}$) and only ratios of the receiver coil gains of R2 remain as coefficients of the off-diagonal elements of $U_{21}$. Similarly the combination:

$$M_{12} = M_{12} M_{21}$$
$$= G_{R1}^{-1} Z_{11}^{-1} Z_{12} Z_{22}^{-1} Z_{21} G_{R1}$$
$$= G_{R1}^{-1} U_{12} G_{R1}$$
$$= \begin{bmatrix} U_{12xx} & \frac{g_{R1y}}{g_{R1x}} U_{12xy} & \frac{g_{R1z}}{g_{R1x}} U_{12xz} \\ \frac{g_{R1x}}{g_{R1y}} U_{12yx} & U_{12yy} & \frac{g_{R1z}}{g_{R1y}} U_{12yz} \\ \frac{g_{R1x}}{g_{R1z}} U_{12zx} & \frac{g_{R1y}}{g_{R1z}} U_{12zy} & U_{12zz} \end{bmatrix}$$

produces a similar quantity in terms of $U_{12}$ and the receiver coil gains of R1.

Note that the zz terms of those matrices are the traditional standard borehole compensated propagation measurement:

$$M_{12zz} = M_{21zz}$$
$$= U_{21zz}$$
$$= U_{12zz}$$
$$= \frac{V_{12zz}V_{21zz}}{V_{11zz}V_{22zz}}$$
$$= \frac{Z_{12zz}Z_{21zz}}{Z_{11zz}Z_{22zz}}.$$

A receiver gain ratio calibration and a gain stabilization mechanism may be used to compensate the receiver gain ratios. Compensation of the gain ratios of the x, y, and z coils for each receiver is technically much easier than compensating the absolute gains.

In rotary drilling, the tool normally rotates about its longitudinal axis. In this case, measurements made on one transverse receiver at rotation angles 90 degrees apart is equivalent to making a measurement with separate orthogonal transverse coils. Because only one transverse coil is employed per receiver, only one gain ratio calibration is required.

Once the gain ratios are compensated, the measurements can be rotated to another reference frame. That is, after compensation, $U_{21}$ and $U_{12}$, can be rotated to a chosen Earth-referenced rotation angle, as each are the product of rotatable tensors:

$$\acute{U}_{12} = R^- U_{12} R = \acute{Z}_{11}^{-1} \acute{Z}_{12} \acute{Z}_{22}^{-1} \acute{Z}_{21}.$$

Air calibration is used in traditional propagation tools to improve measurement accuracy by subtracting out measurement variability due to the finite size and conductivity of the collar.

The borehole compensated air calibration values:

$$U_{air} = V_{22air}^{-1} V_{21air} V_{11air}^{-1} V_{12air}$$

$$U_{air} = \begin{bmatrix} \frac{Z_{12xxair}Z_{21xxair}}{Z_{11xxair}Z_{22xxair}} & 0 & 0 \\ 0 & \frac{Z_{12yyair}Z_{21yair}}{Z_{11yyair}Z_{22yyair}} & 0 \\ 0 & 0 & \frac{Z_{12zzair}Z_{21zzair}}{Z_{11zzair}Z_{22zzair}} \end{bmatrix}$$

may be used to air calibrate the U tensors:

$$U_{21ac} = U_{air}^{-1} U_{21}$$

$$U_{12ac} = U_{air}^{-1} U_{12}.$$

Certain combinations of the U tensors can be formed that give responses similar to what are commonly referred to as the symmetrized and anti-symmetrized measurements. The anti-symmetrized combination is:

$$U_{as} = U_{21ac} U_{12ac}$$

and the symmetrized combination is:

$$U_s = U_{21ac}^{-1} U_{12ac}.$$

The phase shift and attenuation of the propagation tensors are calculated using the matrix square root (sqrtm) and matrix log (log m) functions:

CPS=180./pi.*imag(log m(sqrtm(U12ac)));
CAD=-20*real(log m(sqrtm(U12ac))./log(10);
SPS=180./pi.*imag(log m(sqrtm(Us))));
SAD=-20*real(log m(sqrtm(sqrtm(Us)))./log(10);
APS=180./pi.*imag(log m(sqrtm(Uas))); and
AAD=-20*real(log m(sqrtm(sqrtm(Uas)))./log(10)

where CPS, CAD are the compensated phase shift and attenuations, SPS and SAD are the symmetrized phase shift and attenuations, and APS and AAD are the anti-symmetrized phase shift and attenuations.

In general, because the propagation matrices do not commute, matrix multiplications must be done in a specific order before calculating the matrix phase shift and attenuation. In addition, the gain components should be removed or compensated prior to rotating a tensor. Basic responses for the triaxial arrays of FIG. 3 operating in a homogeneous medium at 2 MHz with near transmitter-receiver spacings of 33 inches and a receiver spacing of 22 inches are shown in FIGS. 4-9.

FIGS. 4 and 5 are, respectively, plots of compensated phase shift and compensated attenuation responses versus toolface angle for each of the nine couplings. Five curves are plotted in each plot, each curve corresponding to a particular anisotropic ratio. For each ratio, the horizontal resistivity is two ohm-m. The relative formation dip is 60 degrees and the azimuthal dip is zero. In the homogeneous medium, the phase shift (PS) and attenuation (AD) responses are equal to the anti-symmetrized phase shift (APS) and anti-symmetrized attenuation (AAD) responses, respectively. The symmetrized phase shift (SPS) and symmetrized attenuation (SAD) responses are zero.

FIGS. 6 and 7 are, respectively, plots of compensated phase shift and compensated attenuation responses versus relative dip angle for each of the nine couplings, wherein the tool x-axis is aligned with the azimuthal dip. Again, five curves are plotted in each plot, each curve corresponding to a particular anisotropic ratio. For each ratio, the horizontal resistivity is two ohm-m. FIGS. 8 and 9 are, respectively, compensated phase shift and compensated attenuation responses versus conductivity for a homogeneous, isotropic formation. The predominantly upper curve in each of those plots is the ZZ response, and the other curve is the XX/YY response.

As an illustrative example, resistivity transforms for the direct terms for a particular case have been computed and are shown in FIG. 10. The plots are, for each coupling, the phase resistivity of a formation with a three foot bed thickness versus the log depth, for five different anisotropic ratios. The signal frequency is 400 kHz and the relative dip is 60 degrees.

For the particular set of bed horizontal and vertical resistivities shown in FIG. 11, where Rh1 is five ohm-m, Rv1 is 10 ohm-m, Rh2 is 20 ohm-m, and Rv2 is 30 ohm-m, the basic responses to the single boundary are shown in FIGS. 12-17. In all cases the beds have "T1" anisotropy (meaning the Rh in a plane parallel to the bed is uniform (Rx=Ry=Rh≠Rv=Rz); note this use of T1 has nothing to do with transmitter identification) with a dip azimuth of zero degrees. The tool is oriented such that the toolface angle is zero. FIGS. 12 and 13 show that the compensated phase shift and compensated attenuation respond to both the bed boundary and to the anistropy. The symmetrized responses are zero in a homogeneous medium and only respond at the bed boundary (FIGS. 16 and 17). At high dip and moderate conductivities, the symmetrized XZ response is independent of anisotropy of the beds, is proportional to the difference in conductivity between the beds, and changes sign depending on whether the tool goes from a conductive to a resistive bed or vice versa. The XX and ZZ symmetrized responses are also zero in a homogeneous medium and only respond at a bed boundary, but in this case it responds to the dip of the bed independent of anisotropy. In the anti-symmetrized responses (FIGS. 14 and 15), the bed boundary response, though present, is reduced compared to the compensated phase shift and compensated attenuation responses.

The above disclosure considers the arrays formed using two triaxial transmitters and two triaxial receivers. Other triaxial transmitter and receiver combinations could be made to form 'mixed' borehole compensated arrays. This can apply to wireline, LWD, coiled tubing, smart completions, and most any other known or reasonably foreseeable conveyance means.

For example, one alternate embodiment is shown in FIG. 18. The matrix phase shift and attenuations computed by the gain calibrated combination:

$$\sqrt{[(V_{32}^{-1}V_{31})(V_{22}^{-1}V_{21})](V_{21}^{-1}V_{11})}$$

would give a response having a depth of investigation comparable to the longer transmitter/receiver spacing. The vertical response would be dominated by the Transmitter 3 response and could provide an electromagnetic look-ahead capability. Not all possible tensor combinations have been disclosed herein; there are other ways of combining propagation tensors that are within the scope of this disclosure.

FIG. 19 shows a flowchart of an embodiment in accordance with the present disclosure that includes providing a logging tool having a plurality of antennas spatially separated along a longitudinal axis of the logging tool (1902); making propagation-style measurements using the plurality of antennas in a formation (1904); forming tensors using the propagation-style measurements (1906); computing one or more quantities using the tensors (1908); and performing a formation evaluation using the one or more computed quantities (1910).

FIG. 20 shows a flowchart of an alternate embodiment in accordance with the present disclosure that includes calculating borehole compensation matrix products using voltages from the triaxial receiver pairs (2002); applying transverse receiver gain ratio corrections (2004); applying air calibration (2006); calculating symmetrized and anti-symmetrized matrix products (2008); rotating the matrix products (2010); and calculating the phase shift and attenuation responses (2012).

A zero-dimension inversion (meaning an inversion using an infinite, homogeneous, anisotropic, dipping formation model) may be performed, while drilling, using a downhole processor and the measurements, and, for example, the determined horizontal resistivity, vertical resistivity, relative dip, and/or azimuthal dip information may be sent to an uphole processor in real-time.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method, comprising:
providing a logging tool having a plurality of triaxial antennas spatially separated along a longitudinal axis of the logging tool, wherein the plurality of triaxial antennas comprises at least two transmitters and at least two triaxial receivers, and wherein each of the triaxial antenna of the plurality of triaxial antennas comprises an orthogonal set of antenna coils;
making triaxial propagation-style measurements in a formation at one or more frequencies using the plurality of triaxial antennas;
forming full conductivity tensors using the triaxial propagation-style measurements;
determining borehole compensated tensors using the full conductivity tensors, without using a priori assumptions regarding formation conductivity;
computing quantities using the borehole compensated tensors
the computed quantities including: a compensated phase shift resistivity, a compensated attenuation resistivity, a symmetrized phase shift resistivity, a symmetrized attenuation resistivity, an anti-symmetrized phase shift resistivity, and an anti-symmetrized attenuation resistivity; and
performing a formation evaluation using the quantities.

2. The method of claim 1, wherein the formation evaluation comprises determining a formation property or parameter selected from the group consisting of horizontal resistivity, vertical resistivity, relative dip, azimuthal dip, bed boundary location, and bed thickness.

3. The method of claim 1, wherein the propagation-style measurements include transfer impedances of the antennas.

4. The method of claim 1, further comprising correcting for antenna gain errors.

5. The method of claim 1, further comprising performing an air calibration on the measurements.

6. The method of claim 1, further comprising performing a gain calibration, followed by a frame of reference transformation.

7. The method of claim 1, further comprising performing, while drilling, a zero-dimension inversion using a downhole processor and the measurements, and sending horizontal resistivity, vertical resistivity, relative dip, and/or azimuthal dip information to an uphole processor in real-time.

8. The method of claim 1, wherein the plurality of triaxial antennas comprises an upper triaxial transmitter disposed above a lower triaxial transmitter on the longitudinal axis, and wherein the plurality of triaxial antennas comprises an upper triaxial receiver and a lower triaxial receiver disposed in between the upper triaxial transmitter and the lower triaxial transmitter on the longitudinal axis.

9. The method of claim 1, wherein determining the borehole compensated tensors comprises determining a gain compensated tensor based on gain ratios for each receiver, without calculating absolute gains of the receivers.

10. The method of claim 9, wherein determining the borehole compensated tensor further comprises:
rotating the gain compensated tensor; and
air calibrating the compensated tensor.

11. The method of claim 10, wherein determining the borehole compensated tensor further comprises calculating phase shift and attenuation of the tensors based on the gain compensated, rotated, air calibrated tensor.

12. A logging tool, comprising:
a plurality of triaxial antennas spatially separated along a longitudinal axis of the logging tool, wherein the plurality of triaxial antennas comprises at least two transmitters and at least two triaxial receivers, and wherein each triaxial antenna of the plurality of triaxial antennas comprises an orthogonal set of antenna coils; and
a downhole processor configured to:
    make triaxial propagation-style measurements in a formation at one or more frequencies using the plurality of antennas;
    form full conductivity tensors using the propagation-style measurements;
    determine borehole compensated tensors using the full conductivity tensors and without using a priori assumptions regarding formation conductivity;
    compute quantities using the borehole compensated tensors
    the computed quantities including: a compensated phase shift resistivity, a compensated attenuation resistivity, a symmetrized phase shift resistivity, a symmetrized attenuation resistivity, an anti-symmetrized phase shift resistivity, and an anti-symmetrized attenuation resistivity; and
    perform a formation evaluation using the computed quantities.

13. The logging tool of claim 12, wherein one or more of the antennas is a co-located triaxial antenna.

14. The logging tool of claim 12, wherein the plurality of triaxial antennas comprises an upper triaxial transmitter disposed above a lower triaxial transmitter on the longitudinal axis, and wherein the plurality of triaxial antennas comprises an upper triaxial receiver and a lower triaxial receiver disposed in between the upper triaxial transmitter and the lower triaxial transmitter on the longitudinal axis.

* * * * *